(12) United States Patent
Orsini et al.

(10) Patent No.: US 10,676,298 B2
(45) Date of Patent: Jun. 9, 2020

(54) RELOADING SUPPLY CART

(71) Applicant: Sealed Air Corporation (US), Charlotte, NC (US)

(72) Inventors: Thomas P. Orsini, Sterling, MA (US); Daniel N. LaFrance, Worcester, MA (US); Christopher C. Hamlin, Worcester, MA (US); Russell T. Christman, Dunstable, MA (US)

(73) Assignee: Sealed Air Corporation (US), Charlotte, NC (US)

( * ) Notice: Subject to any disclaimer, the term of this patent is extended or adjusted under 35 U.S.C. 154(b) by 0 days.

(21) Appl. No.: 16/082,687

(22) PCT Filed: May 10, 2017

(86) PCT No.: PCT/US2017/031842
§ 371 (c)(1),
(2) Date: Sep. 6, 2018

(87) PCT Pub. No.: WO2017/196907
PCT Pub. Date: Nov. 16, 2017

(65) Prior Publication Data
US 2019/0092587 A1 Mar. 28, 2019

Related U.S. Application Data

(60) Provisional application No. 62/334,546, filed on May 11, 2016.

(51) Int. Cl.
*B65H 1/26* (2006.01)
*B65H 5/00* (2006.01)
*B62B 1/12* (2006.01)
*B62B 3/12* (2006.01)
*B62B 3/00* (2006.01)
(Continued)

(52) U.S. Cl.
CPC ............... *B65H 1/266* (2013.01); *B62B 1/12* (2013.01); *B65H 1/26* (2013.01); *B65H 5/006* (2013.01);
(Continued)

(58) Field of Classification Search
CPC .... B65H 2405/312; B65H 2301/42252; B62B 2203/04; B65G 69/006
See application file for complete search history.

(56) References Cited

U.S. PATENT DOCUMENTS 2,711,835 A * 6/1955 Kappen .................. B65G 67/20
414/401
5,144,369 A * 9/1992 Benedict ............ G03G 15/0126
399/119

(Continued)

OTHER PUBLICATIONS

Written Opinion of the International Searching Authority in PCT Application No. PCT/US2017/031842, dated Nov. 16, 2017.

*Primary Examiner* — Mark C Hageman
(74) *Attorney, Agent, or Firm* — Jon M. Isaacson

(57) ABSTRACT

A reloading supply system includes a loading cart (100) and a machine (200). The loading cart has a first material tray (120) that includes a first combed surface (122) configured to retain a supply material in the first material tray. The machine has a second material tray (220) that includes a second combed surface (222) configured to retain the supply material in the second material tray after the supply material is transferred from the first material tray of the loading cart to the second material tray of the machine. Teeth (124) of the first combed surface are configured to pass by teeth (224) of the second combed surface. The first combed surface and the second combed surface are configured such that the supply material in the first material tray is transferred to the second material tray as the teeth of the first combed surface pass by the teeth of the second combed surface.

12 Claims, 19 Drawing Sheets

(51) Int. Cl.
  *B62B 3/02* (2006.01)
  *B62B 1/08* (2006.01)

(52) U.S. Cl.
  CPC ........ *B31D 2205/0035* (2013.01); *B62B 1/08* (2013.01); *B62B 3/006* (2013.01); *B62B 3/008* (2013.01); *B62B 3/02* (2013.01); *B62B 3/12* (2013.01); *B62B 2202/64* (2013.01); *B62B 2301/25* (2013.01); *B65H 2301/42252* (2013.01); *B65H 2405/111* (2013.01); *B65H 2405/312* (2013.01); *B65H 2701/1824* (2013.01)

(56) References Cited

U.S. PATENT DOCUMENTS

| | | | | |
|---|---|---|---|---|
| 5,413,449 | A | * | 5/1995 | Schoenherr ............... B41J 11/58 |
| | | | | 414/343 |
| 5,456,571 | A | * | 10/1995 | Schoenherr ............... B41J 11/58 |
| | | | | 414/343 |
| 5,692,999 | A | * | 12/1997 | Crowley ................... B62B 1/08 |
| | | | | 108/1 |
| 5,971,691 | A | * | 10/1999 | Munson, Jr. .............. B62B 1/14 |
| | | | | 414/398 |
| 6,027,298 | A | | 2/2000 | Crowley |
| 6,756,096 | B2 | | 6/2004 | Harding |
| 6,887,329 | B2 | | 5/2005 | Harding |
| 7,614,994 | B2 | | 11/2009 | Harding et al. |
| 2008/0011437 | A1 | | 1/2008 | Cast et al. |
| 2013/0237398 | A1 | | 9/2013 | Lintala et al. |
| 2015/0119224 | A1 | | 4/2015 | Orsini et al. |

* cited by examiner

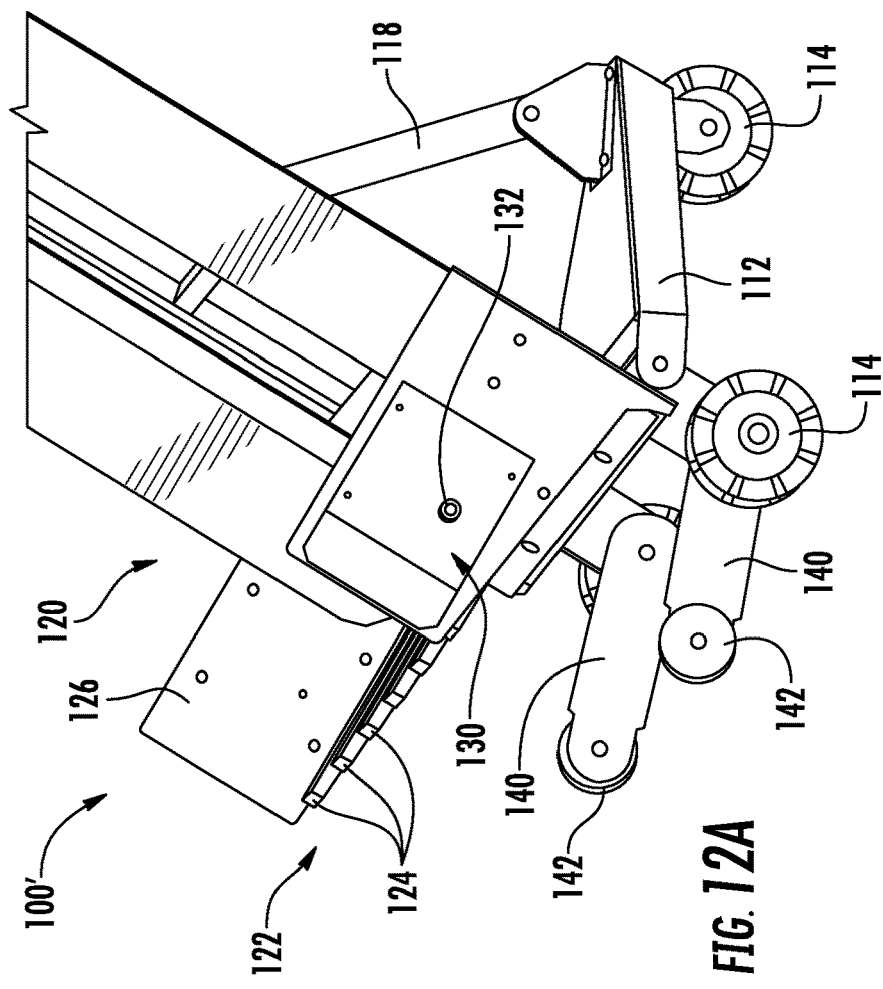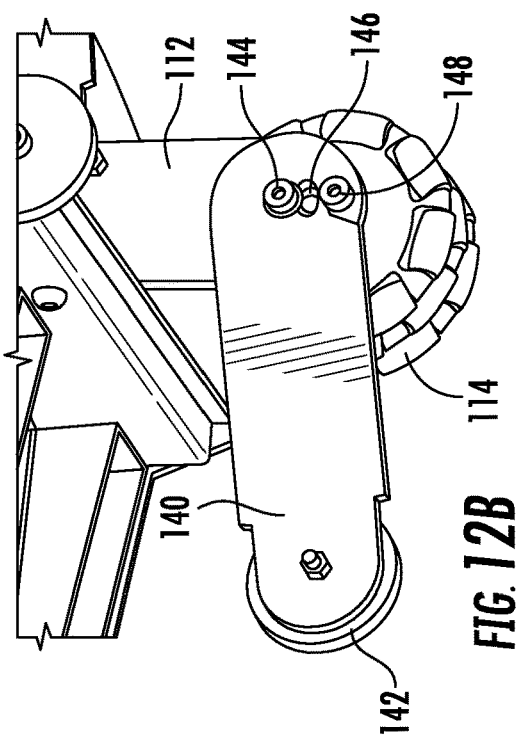

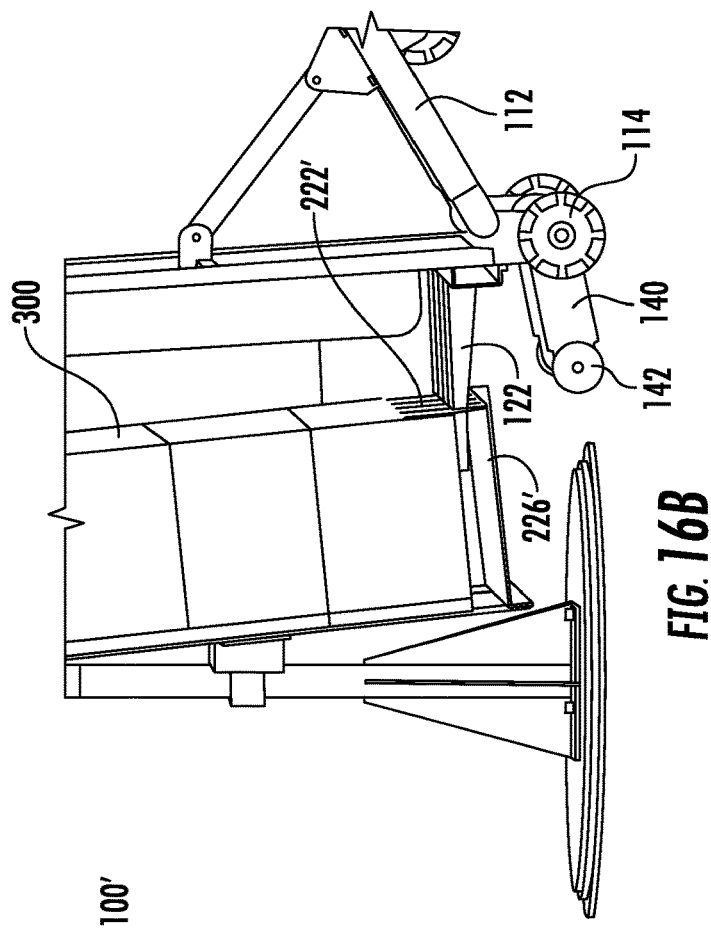
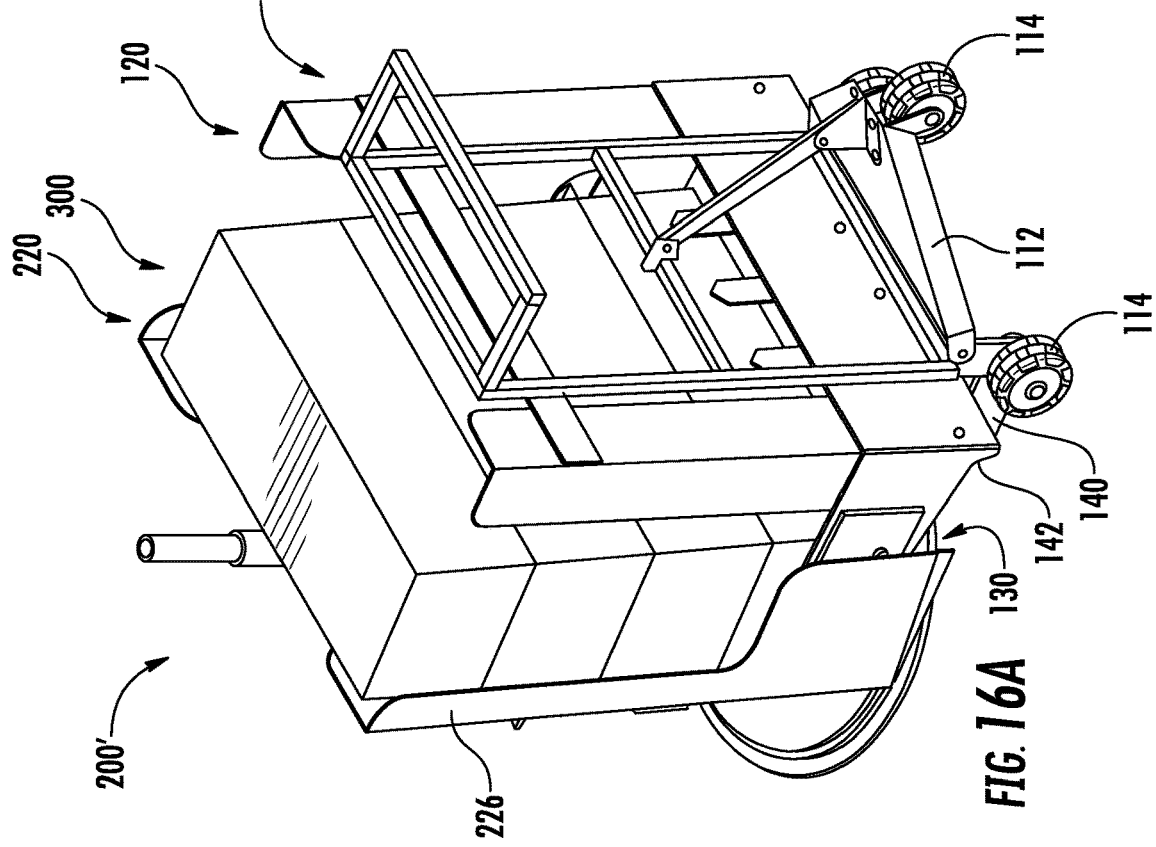
FIG. 16B
FIG. 16A

RELOADING SUPPLY CART

BACKGROUND

The present disclosure is in the technical field of reloading supply carts. More particularly, the present disclosure is directed to supply carts used to supply paper to paper dunnage producing machines.

Paper dunnage producing machines convert stock paper to paper dunnage. The stock paper is typically in sheet form. The paper dunnage producing machine typically converts the sheet stock paper into dunnage having a three-dimensional shape, such as by crumpling, folding, crimping, etc. The paper dunnage is significantly less dense than the sheet stock paper and the paper dunnage is capable of being used as cushioning, such as in the case of paper dunnage used as packaging material in shipping containers. Paper dunnage is a favored packaging material in some conditions because of the ability to recycle or reuse the dunnage after its initial use.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a reloading supply system includes a loading cart having a first material tray and a machine having a second material tray. The first material tray includes a first combed surface configured to retain a supply material in the first material tray. The second material tray includes a second combed surface configured to retain the supply material in the second material tray after the supply material is transferred from the first material tray of the loading cart to the second material tray of the machine. Teeth of the first combed surface are configured to pass by teeth of the second combed surface. The first combed surface and the second combed surface are configured such that the supply material in the first material tray is transferred to the second material tray as the teeth of the first combed surface pass by the teeth of the second combed surface.

In one example, the supply material includes sheet paper. In another example, the sheet paper is fanfold paper. In another example, the supply material includes a plurality of stacked reams of the fanfold paper. In another example, an end sheet of a first ream of the plurality of stacked reams is coupled to an end sheet of a second ream of the plurality of stacked reams such that the first ream and the second ream form a continuous segment of the fanfold paper. In another example, the end sheet of the first ream is coupled to the end sheet of the second ream by double-sided tape. In another example, the loading cart includes at least one omnidirectional wheel.

In another example, the loading cart further comprises a first guide component and the machine comprises a second guide component. In another example, the first guide component is configured to engage the second guide component when the loading cart is in a first rotational position. In another example, the first guide component is further configured to guide movement of the loading cart with respect to the machine to a point at which rotation of the loading cart to a second rotational position causes the teeth of the first combed surface to pass by the teeth of the second combed surface to transfer the supply material from the first material tray to the second material tray. In another example, the second guide component comprises a track having a first end and a second end. In another example, the first guide component comprises a track engagement member configured to be moved through the track between the first end and the second end. In another example, the track engagement member is configured to be aligned with the first end of the track when the loading cart is in the first rotational position, and wherein the track engagement member is configured to be aligned with the second end of the track when the loading cart is in the second rotational position. In another example, the first end of the track is a funneling end configured to direct the track engagement member into the track. In another example, the second end of the track is a funneling end configured to direct the track engagement member into the track. In another example, movement of the track engagement member through the track from the second end to the first end is configured to guide movement of the loading cart with respect to the machine to a point at which rotation of the loading cart from the second rotational position causes the teeth of the first combed surface to pass by the teeth of the second combed surface to transfer the supply material from the second material tray to the first material tray. In another example, the loading cart comprises a plurality of wheels configured to be on a surface when the loading cart is in the first rotational position. In another example, at least one of the plurality of wheels is configured to be off of the surface when the loading cart is in the second rotational position.

In another embodiment, a loading cart includes a first material tray configured to hold a supply material and a first combed surface configured to retain the supply material in the first material tray. Teeth of the first combed surface are configured to pass by teeth of a second combed surface of a machine that includes a second material tray. The second material tray includes the second combed surface and the second combed surface is configured to retain the supply material in the second material tray after the supply material is transferred from the first material tray of the loading cart to the second material tray of the machine. The first combed surface is configured such that the supply material in the first material tray is transferred to the second material tray as the teeth of the first combed surface pass by the teeth of the second combed surface.

In one example, the loading cart further includes rotational stops configured to prevent over-rotation of the loading cart. In another example, at least one of the rotational stops includes a surface interaction device at a forward end of the at least one of the rotational stops. In another example, the rotational stops are rotatably coupled to a frame of the loading cart. In another example, the rotational stops include a rotation-limiting mechanism configured to permit one of the rotational stops to rotate within a particular range with respect to the frame.

In another embodiment, a machine is configured to be loaded with supply material by a loading cart having first material tray configured to hold the supply material and a first combed surface configured to retain the supply material in the first material tray. The machine includes a second material tray configured to hold a supply material after the supply material is transferred from the first material tray of the loading cart to the second material tray of the machine. The machine also includes a second combed surface configured to retain the supply material in the second material tray. Teeth of the first combed surface are configured to pass by teeth of the second combed surface. The second combed surface is configured such that the supply material in the first material tray is transferred to the second material tray as the teeth of the first combed surface pass by the teeth of the second combed surface.

In one example, the second combed surface is oriented such that, when the teeth of the first combed surface pass by the teeth of the second combed surface, the second combed surface is arranged in a different orientation than an orientation of the first combed surface. In another example, when the teeth of the first combed surface pass by the teeth of the second combed surface, the second combed surface is arranged substantially perpendicular to the first combed surface.

BRIEF DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein:

FIGS. 12A and 12B depict an embodiment of a loading cart configured to prevent over-rotation of the loading cart, in accordance with the embodiments disclosed herein;

FIGS. 13-18 depict a series of instances showing an embodiment of transferring supply material from a material tray of a loading cart to a material tray of a machine, in accordance with the embodiments disclosed herein.

DETAILED DESCRIPTION

The present disclosure describes embodiments of a reloading supply system. In particular, the present disclosure describes embodiments of a reloading supply carts usable to supply paper to paper dunnage producing machines.

When a paper dunnage producing machine uses its supply of paper, the paper dunnage producing machine must be reloaded with a new supply of paper to be able to continue creating paper dunnage. Reloading paper on the paper dunnage producing machine can be time-consuming and problematic. In one example, paper is dense in sheet form, and supplies of paper for dunnage producing machines can be heavy. Placing heavy paper supplies in their proper location takes time and effort. In another example, some paper comes in the form of reams of fanfold paper and the paper dunnage producing machine is capable of holding multiple reams. Properly placing each ream of fanfold paper takes time and effort. In addition, neighboring reams of fanfold paper are typically coupled together (e.g., using tape) such that the neighboring reams form a continuous segment of fanfold paper. Coupling the end sheets of neighboring reams of paper also takes time and effort.

During the time that a paper dunnage producing machine is resupplied with paper, the paper dunnage producing machine cannot be operating to produce paper dunnage. The greater the time required to reload the paper dunnage producing machine with paper, the longer that paper dunnage cannot be produced and shipments cannot be prepared. Thus, it would be advantageous to reduce the amount of time required to reload paper onto a paper dunnage producing machine.

Disclosed herein are embodiments of reloading supply systems that include a loading cart and a machine that uses a supply material, such as fanfold paper for paper dunnage producing machines. The supply material is prepared for use by the machine and loaded on a material tray of the loading cart. When a material tray of the machine is empty, the loading cart is used to reload the material tray of the machine using the supply material that is already prepared and loaded on the material tray of the loading cart. The loading cart and the machine include guide components that guide movement of the loading cart with respect to the machine to a point at which the loading cart can be rotated to cause the supply material to be transferred from the material tray of the loading cart to the material tray of the machine.

Figure 1:
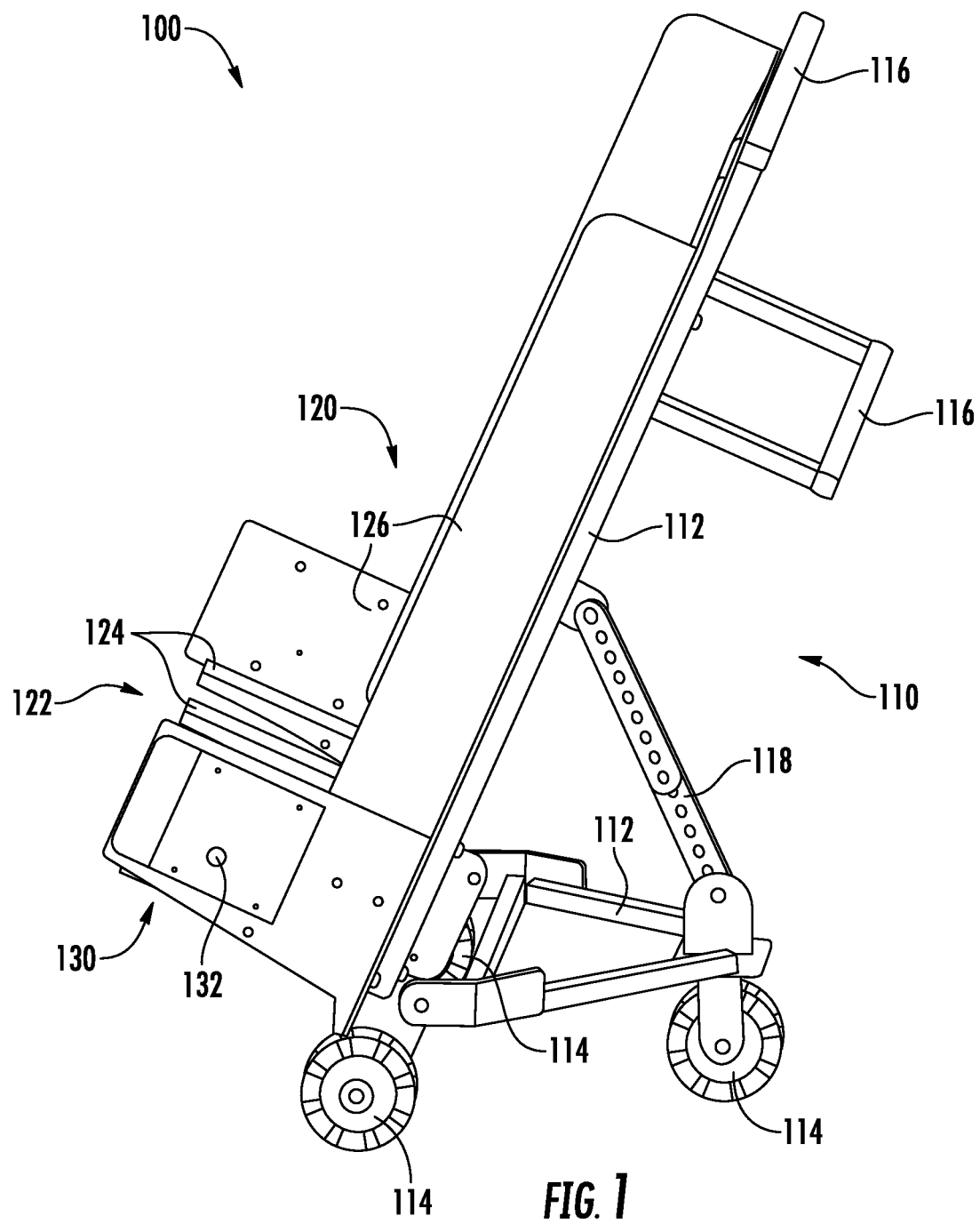
FIG. 1 depicts a perspective view of an embodiment of a loading cart.

Depicted in FIG. 1 is a perspective view of an embodiment of a loading cart 100. The loading cart 100 includes a frame assembly 110. The frame assembly 110 has a frame 112 and wheels 114 coupled to the frame 112. In some embodiments, the wheels 114 are omnidirectional wheels that are configured to allow the loading cart 100 to move in any direction along a surface. An embodiment of an omnidirectional wheel is described in greater detail below with respect to FIG. 11. In other embodiments, the wheels 114 include one or more swivel caster wheels or any other type of wheels. In some embodiments, the frame assembly 110 includes one or more handles 116 configured to be grasped by a user to push the loading cart 100 or to rotate the loading cart 100.

The loading cart 100 also includes a material tray 120. The material tray 120 is configured to hold the supply material. In the depicted embodiment, the material tray 120 includes a combed surface 122. The combed surface 122 includes individual teeth 124. The individual teeth 124 of the combed surface 122 are configured to hold the supply material. In the depicted embodiment, the material tray 120 includes side walls 126. The side walls 126 are configured to prevent the supply material from falling out of the material tray 120. The side walls 126 are also usable to align the supply material in the material tray 120.

In some embodiments, the frame assembly 110 includes an adjustable member 118 configured to permit a user to selectively set the angle of the material tray 120. Using the adjustable member 118 to set the angle of the material tray 120 may be beneficial in certain circumstances, such as to be able to load supply material on the material tray 120 safely, to distribute weight on the loading cart 100 safely for moving the loading cart 100, and the like.

The loading cart 100 also includes a guide component 130. In the depicted embodiment, the guide component 130 is coupled to one of the side walls 126 on the near side of the loading cart 100. In some embodiments, the loading cart includes a similar guide component (not visible in FIG. 1) on the far side of the loading cart 100. In the depicted embodiment, the guide component 130 includes a track engagement member 132 (e.g., a post, a screw, etc.). The guide component 130 on the loading cart 100 is configured to engage a guide component on a machine and to guide movement of the loading cart 100 with respect to the machine to a point at which the loading cart 100 can be rotated to cause the supply material to be transferred from the material tray 120 to a material tray of the machine.

Figure 2:
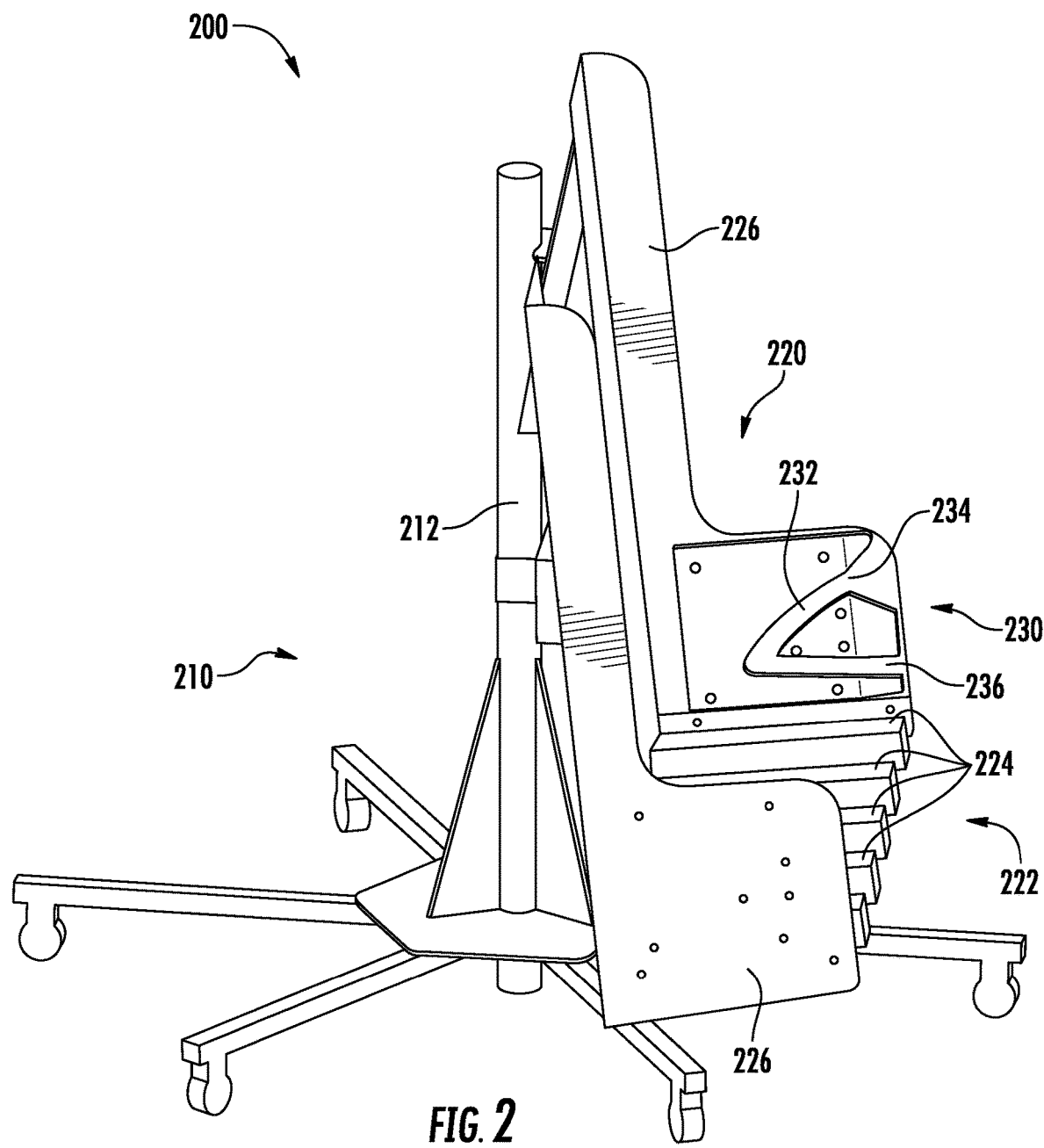
FIG. 2 depicts a perspective view of a portion of an embodiment of a machine that is usable with the loading cart depicted in FIG. 1, in accordance with the embodiments disclosed herein.

A portion of an embodiment of a machine 200 that is usable with the loading cart 100 is depicted in FIG. 2. The machine includes a frame assembly 210 with a frame 212. The frame is coupled to a material tray 220 that is configured to hold supply material. In FIG. 2, the depicted portion of the machine 200 does not show the portion of the machine 200 that uses the supply material. For example, in some embodiments, the machine 200 also includes a paper dunnage producing machine that creates paper dunnage from sheet paper loaded in the frame assembly 210.

In the depicted embodiment, the material tray 220 includes a combed surface 222. The combed surface 222 includes individual teeth 224. The individual teeth 224 of the combed surface 222 are configured to hold the supply material. In the depicted embodiment, the material tray 220 includes side walls 226. The side walls 226 are configured to prevent the supply material from falling out of the material tray 220. The side walls 226 are also usable to align the supply material in the material tray 220.

The machine 200 also includes a guide component 230. In the depicted embodiment, the guide component 230 is coupled to the inside of one of the side walls 226 on the far side of the machine 200. In some embodiments, the loading cart includes a similar guide component (not visible in FIG. 2) on the inside of the near side wall of the machine. In the depicted embodiment, the guide component 230 includes a track 232 that includes a first end 234 and a second end 236. The first and second ends 234 and 236 are configured to permit passage of the track engagement member 132 on the loading cart 100 into and out of the track 232. The track is configured to guide the track engagement member 132 during movement of the loading cart 100 with respect to the machine 200 to a point at which the loading cart 100 can be rotated to cause the supply material to be transferred from the material tray 120 of the loading cart 100 to the material tray 220 of the machine 200.

Figure 3:
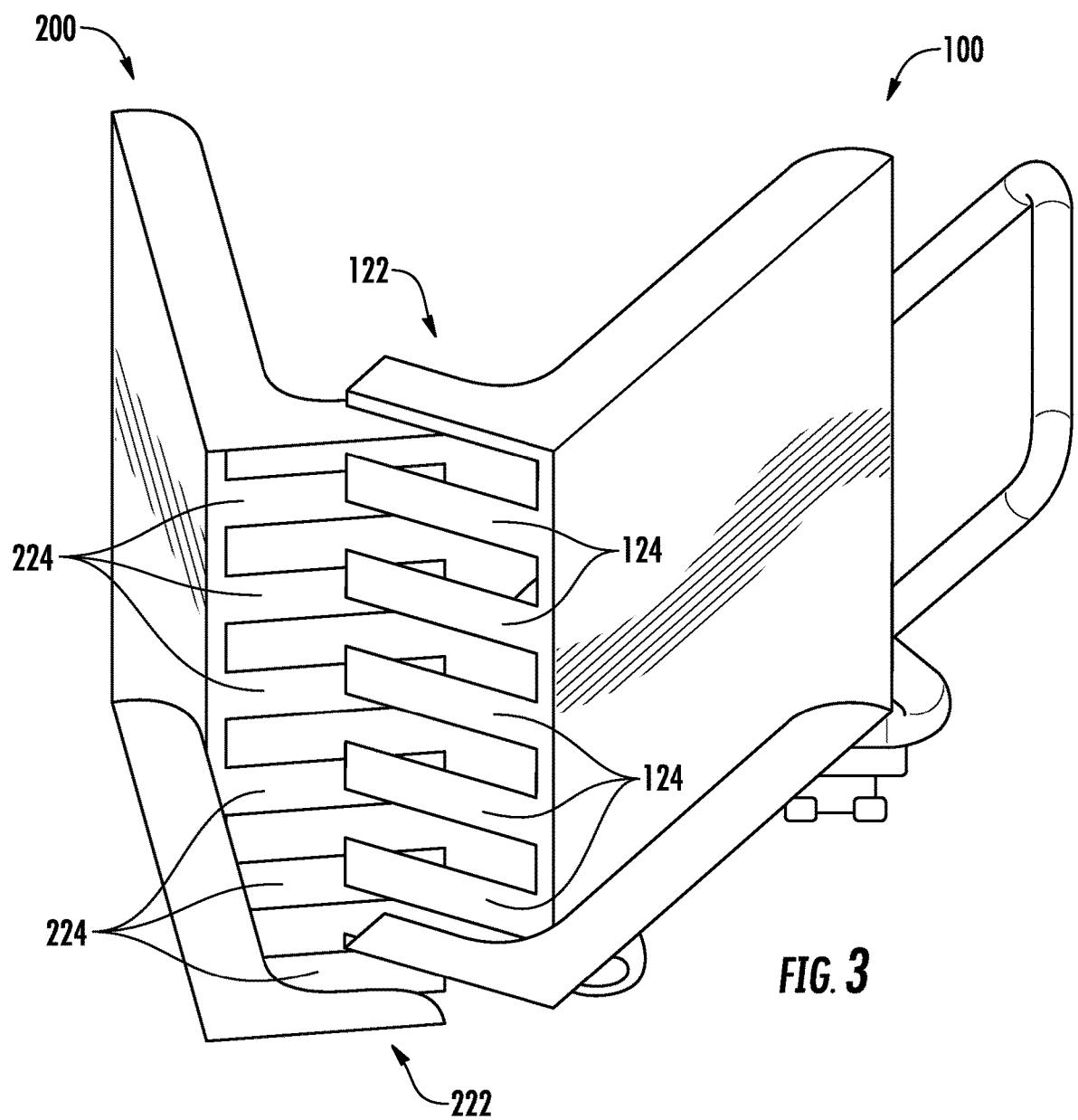
FIG. 3 depicts a top perspective view of an embodiment of interaction of a material tray of the loading cart depicted in FIG. 1 and a material tray of the machine depicted in FIG. 2, in accordance with the embodiments disclosed herein.

The material tray 120 of the loading cart 100 and the material tray 220 of the machine 200 are configured to interact with each other to transfer supply material from the material tray 120 of the loading cart 100 to the material tray 220 of the machine 200 and vice versa. One embodiment of the interaction of the material tray 120 of the loading cart 100 and the material tray 220 of the machine 200 is depicted in FIG. 3. As shown in FIG. 3, the combed surface 122 of the loading cart 100 and the combed surface 222 of the machine 200 are configured to pass through each other. In some embodiments, the teeth 124 of the combed surface 122 are configured to pass by the teeth 224 of the combed surface 222 as the loading cart 100. In one example, the teeth 124 of the combed surface 122 are configured to pass by the teeth 224 of the combed surface 222 as the loading cart 100 is rotated with respect to the machine 200.

As shown in greater detail below, the interaction of the combed surface 122 and the combed surface 222 permits supply material in the material tray 120 to be transferred to the material tray 220 as the combed surface 122 passes through the combed surface 222. In some examples, the combed surface 122 and the combed surface 222 are configured such that supply material in the material tray 120 is transferred to the material tray 220 as the teeth 124 of the combed surface 122 pass by the teeth 224 of the combed surface 222.

Figure 4:
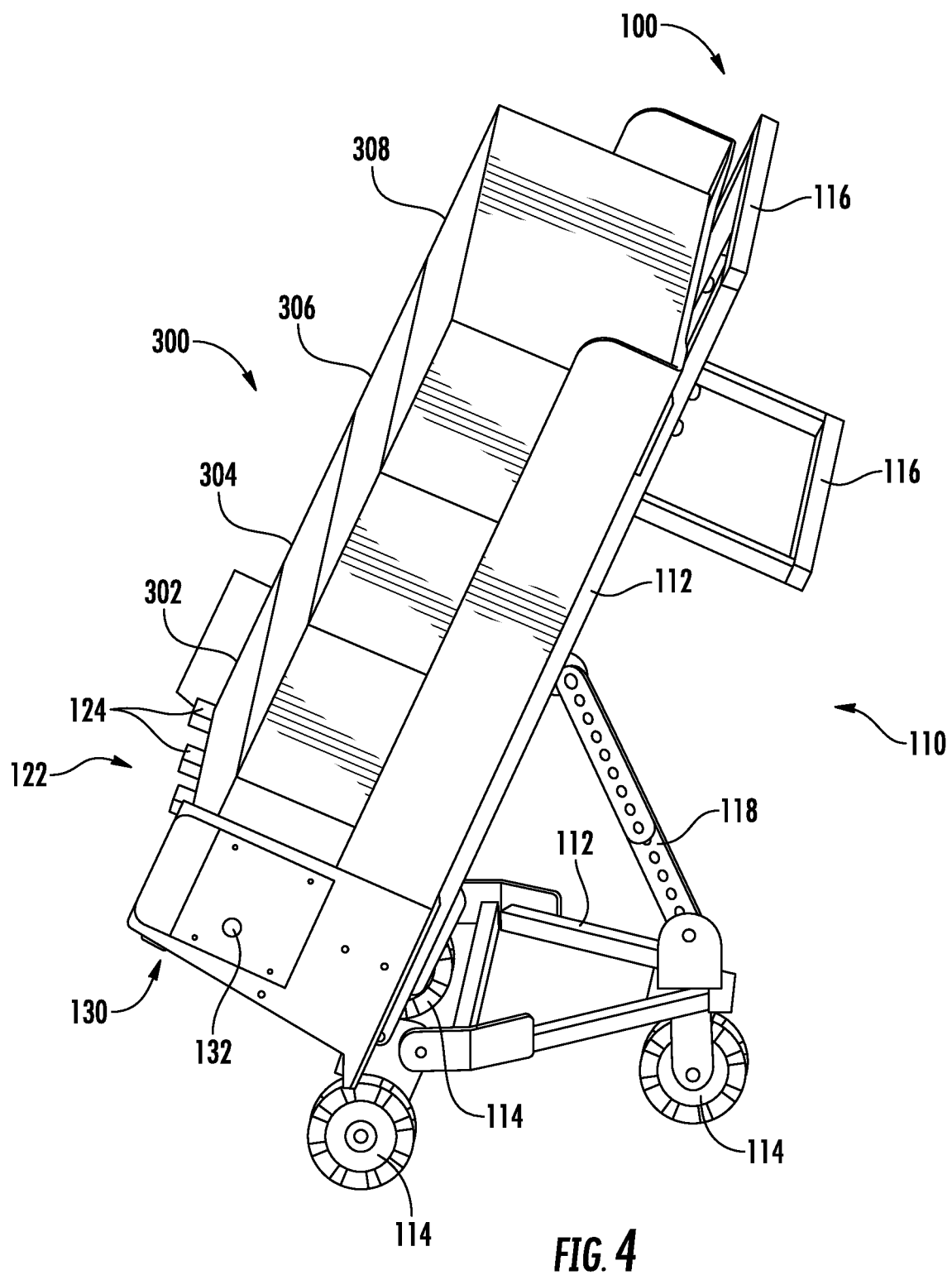
FIG. 4 depicts an embodiment of the loading cart depicted in FIG. 1 with a partial load of supply material, in accordance with the embodiments disclosed herein.

The loading cart 100 is capable of being used to prepare supply material for use by the machine 200. The loading cart 100 is depicted in FIG. 4 with a partial load of supply material 300. In the embodiment depicted, the supply material 300 is sheet paper in the form of reams of fanfold sheet paper. The combed surface 122 of the material tray 120 is configured to retain the supply material 300. In one embodiment, the supply material 300 is loaded in the material tray 120 by first placing a first ream 302 of fanfold paper in the material tray 120 on the combed surface 122. A second ream 304 is placed on top of the first ream 302 in the material tray 120 and a third ream 306 is placed on top of the second ream 304 in the material tray.

One difficulty with using multiple reams of supply material is that, once the machine has used one ream, the machine may not be configured to automatically start using the next ream. In the machine is not configured to automatically start using the next ream, a user may need to identify each time that a ream has been used and connect the next ream to the machine. In order to avoid this issue, it may be advantageous to couple end sheets of each ream to that the multiple reams for a continuous segment of fanfold paper. In this way, as the machine reaches the end sheet of one ream, the coupling of the end sheet of that ream to the end sheet of the next ream with allow the machine to automatically use the next ream with the first ream is depleted.

Figure 5:
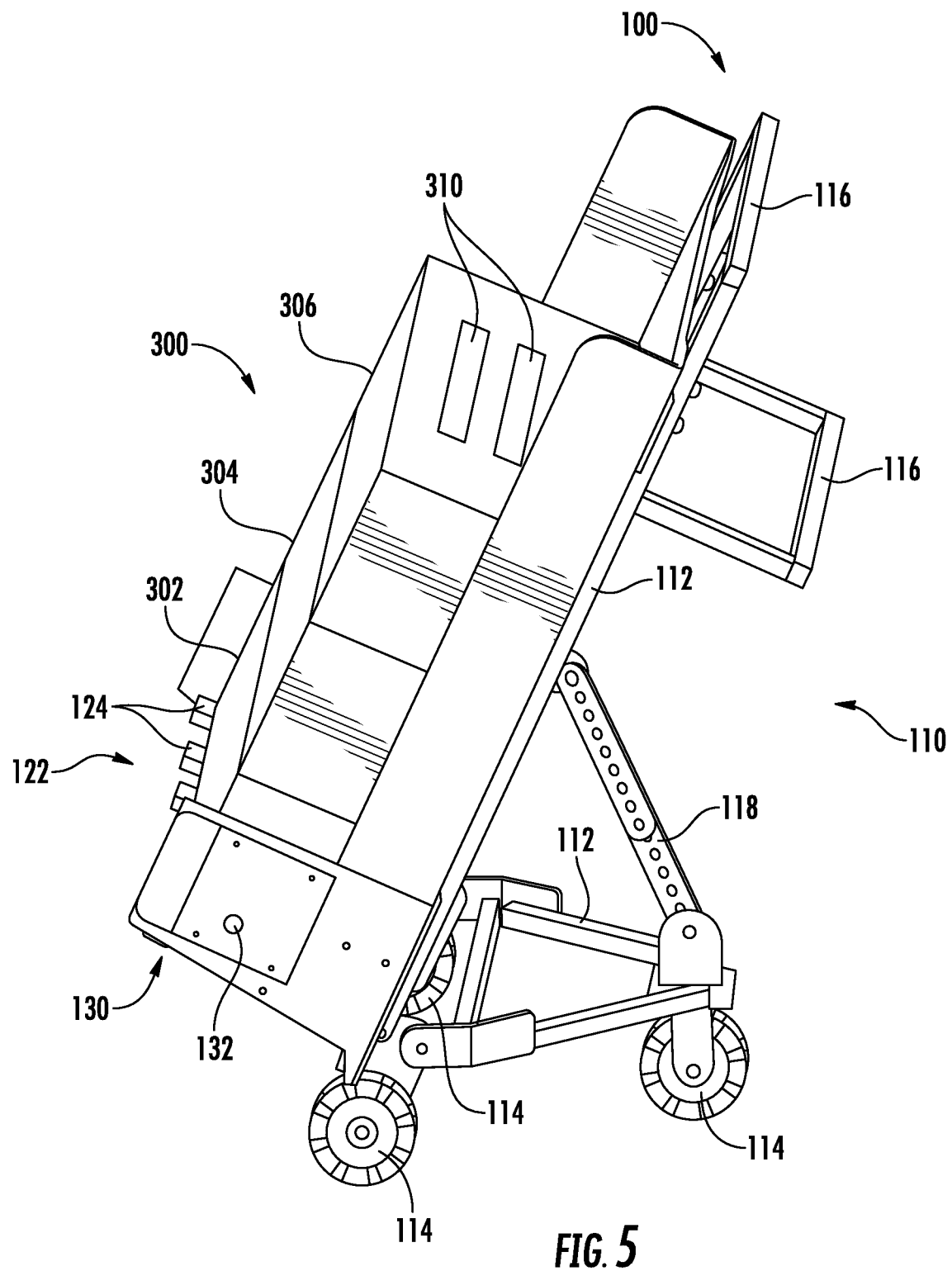
FIG. 5 depicts an embodiment of the loading cart depicted in FIG. 1 with a full load of supply material, in accordance with the embodiments disclosed herein.

Returning back to the example in FIG. 4, after the first ream 302 is placed in the material tray 120, a coupling mechanism is placed on the top end sheet of the first ream 302. In some embodiments, the coupling mechanism is double-sided tape, liquid adhesive, or any other mechanism that will stick to the top end sheet of the first ream 302 and the bottom end sheet of the second ream 304. After the coupling mechanism is placed on the top end sheet of the first ream 302, the second ream 304 is placed on top of the first ream 302 in the material tray 120. This couples the top end sheet of the first ream 302 to the bottom end sheet of the second ream 304. A coupling mechanism is then placed on the top end sheet of the second ream 304 and the third ream is placed on top of the second ream 304 in the material tray 120. This couples the top end sheet of the second ream 304 to the bottom end sheet of the third ream 306. In the instance depicted in FIG. 4, a coupling mechanism 310 is placed on the top end sheet of the third ream 306. In the depicted embodiment, the coupling mechanism 310 includes double-sided tape. As shown in FIG. 5, a fourth ream 308 is placed on top of the third ream 306 in the material tray 120. This couples the top end sheet of the third ream 306 to the bottom end sheet of the fourth ream 308.

In the embodiment depicted in FIG. 5, the supply material 300 is fully prepared for use by the machine 200. The reams 302, 304, 306, and 308 are coupled to form a continuous segment of the fanfold paper. Once the supply material 300 is transferred from the material tray 120 of the loading cart 100 to the material tray 220 of the machine 200, the machine will be capable of using the entire supply of supply material 300. Because the supply material 300 can be fully prepared in the material tray 120 of the loading cart 100, the supply material 300 can be prepared while the machine 200 is operating and using its existing supply. Once the existing supply in the machine 200 is depleted, the supply material 300 is ready to be placed in the material tray 220 of the machine 200 without the need to prepare the supply material 300 in the material tray 220 of the machine 200.

Figure 6:
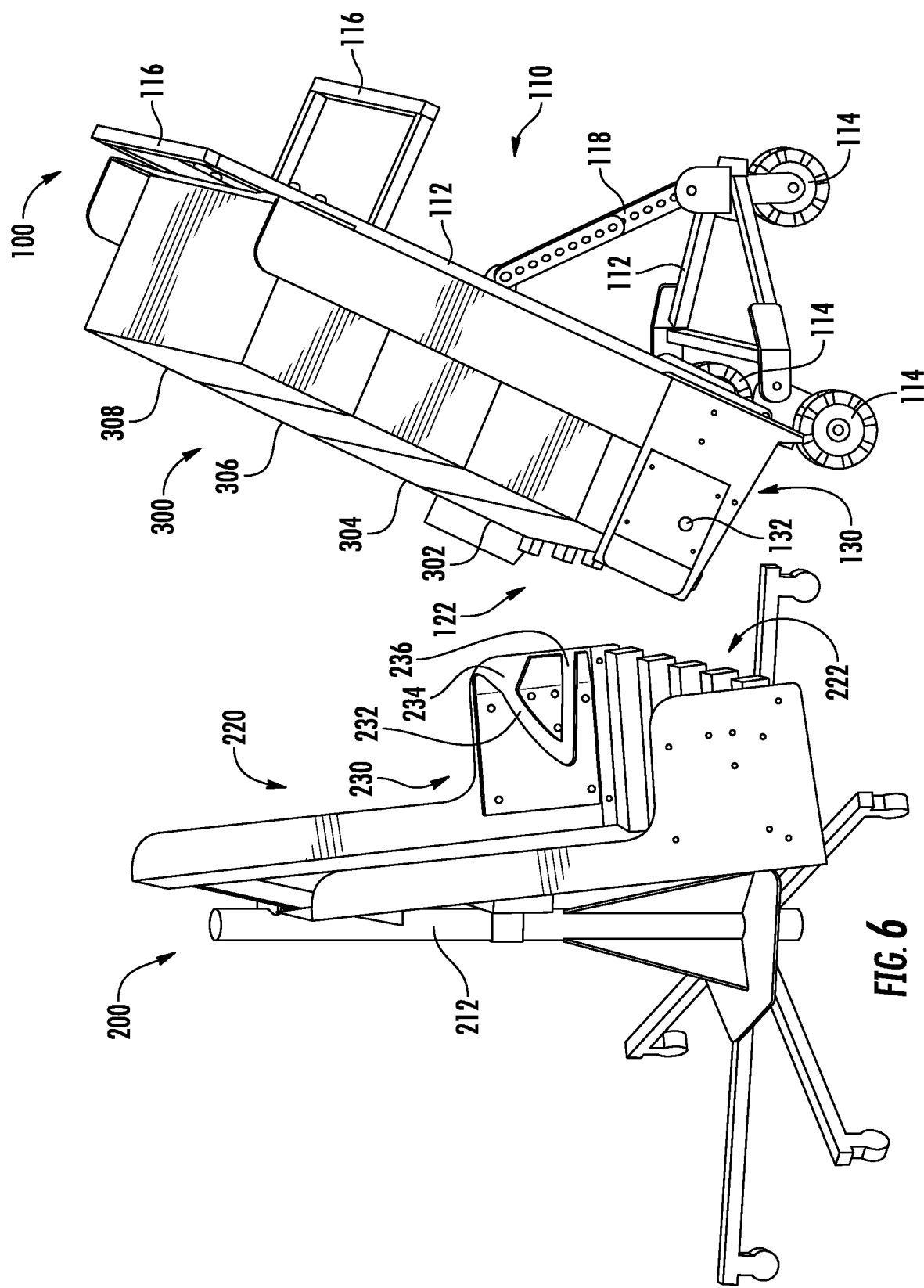
FIGS. 6-10 depict a series of instances showing an embodiment of transferring supply material from a material tray of the loading cart depicted in FIG. 1 to a material tray of the machine depicted in FIG. 2, in accordance with the embodiments disclosed herein.

An embodiment of transferring the supply material 300 from the material tray 120 of the loading cart 100 to the material tray 220 of the machine 200 is depicted in a series of instances shown in FIGS. 6-10. In FIG. 6, the supply material 300 is fully prepared and loaded in the material tray 120 of the loading cart 100, similar to the embodiment shown in FIG. 5. The loading cart 100 and the machine 200 are located on the same surface (e.g., a floor). In the embodiment depicted in FIG. 6, the loading cart 100 is in a first rotational position. In some embodiments, all of the wheels 114 of the loading cart 100 are on the surface when the loading cart 100 is in the first rotational position.

In some embodiments, when the loading cart 100 is in the first rotational position, the guide component 130 of the loading cart 100 is aligned with the guide component 230 of the machine 200. In the particular embodiment depicted in FIGS. 6 and 7, where the loading cart 100 is in the first rotational position, the height of the track engagement member 132 of the guide component 130 from the surface is aligned with the height of the first end 234 of the track 232. As the loading cart 100 is pushed from its position shown in FIG. 6 to the position shown in FIG. 7, the track engagement member 132 enters the track 232 through the first end 234 of the track 232. As shown in FIG. 6, the first end 234 of the track 232 is a funneling end configured to direct the track engagement member 132 into the track 232.

The track engagement member 132 is configured to engage the track 232 to guide movement of the loading cart 100 with respect to the machine 200 to a point at which the loading cart 100 can be rotated to cause the supply material 300 to be transferred from the material tray 120 of the loading cart 100 to the material tray 220 of the machine 200. In some embodiments, as shown in the embodiment in FIG. 6, the track 232 is in the form of a "V" and the track 232 guides the track engagement member 132 to the point depicted in FIG. 7 where the track engagement member 132 is in the point of the V. At that point, the loading cart 100 can be rotated to a second rotational position, which is depicted in FIG. 8. Rotation of the loading cart 100 from the first rotational position to the second rotational position includes at least some rotation of the loading cart 100. In some embodiments, rotation of the loading cart 100 from the first rotational position to the second rotational position does not include translational movement of the loading cart 100. In some embodiments, such as in the embodiment depicted in FIGS. 6-10, rotation of the loading cart 100 from the first rotational position to the second rotational position includes translational movement of the loading cart 100. In the depicted embodiment, as the loading cart 100 rotates from the point depicted in FIG. 7 to the second rotational position depicted in FIG. 8, the teeth 124 of the combed surface 122 pass through the teeth 224 of the combed surface 222 as the loading cart such that the supply material 300 is transferred from the material tray 120 of the loading cart 100 to the material tray 220 of the machine 200. Thus, in the instance shown in FIG. 8, the supply material 300 is retained by the combed surface 222 of the machine 200.

Figure 7:
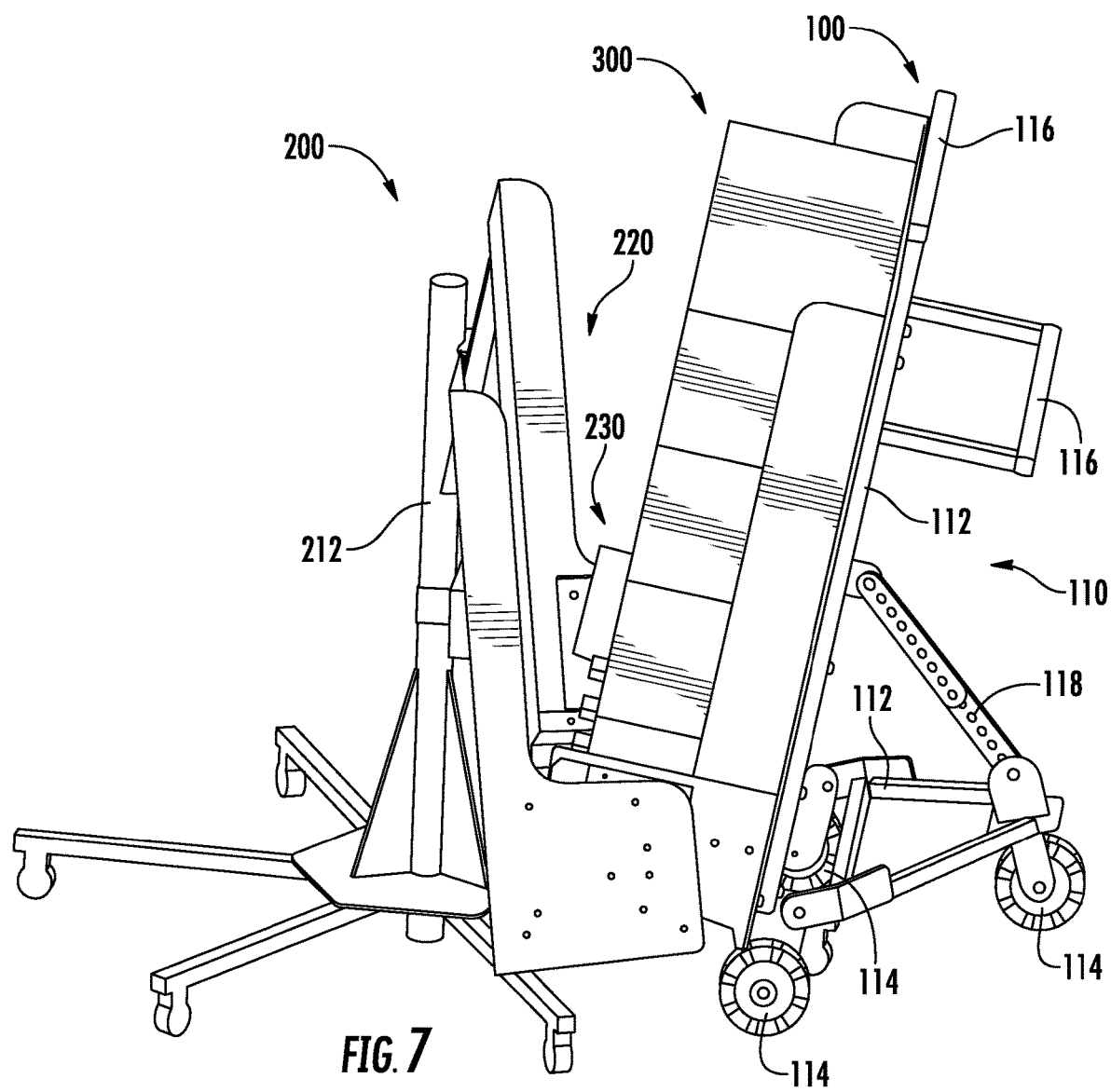
Figure 8:
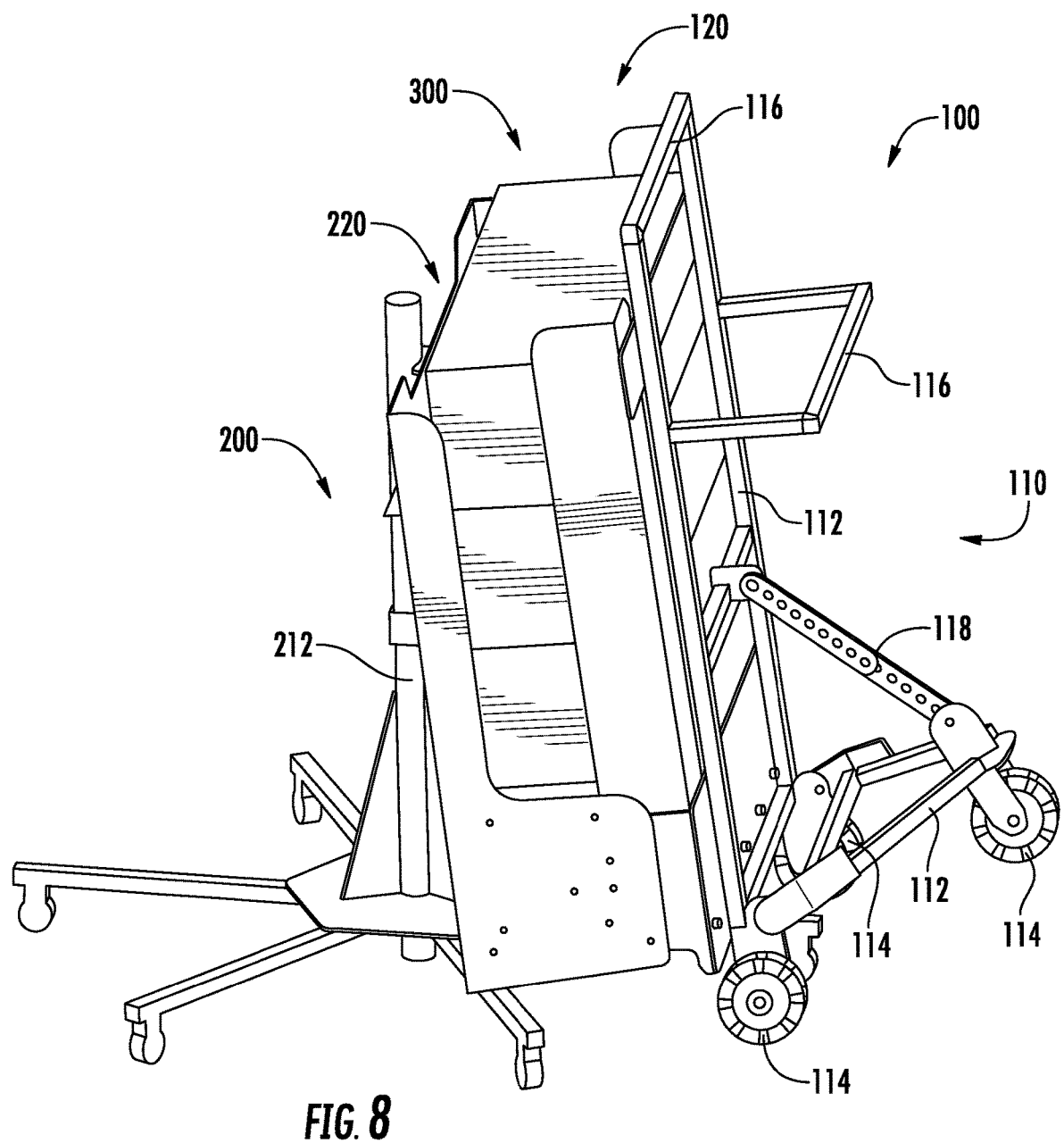

While the embodiment shown in FIGS. 7 and 8 depict the loading cart 100 being rotated to transfer the supply material 300 from the material tray 120 to the material tray 220, any motion of the loading cart 100 with respect to the machine 200 can be used to cause the teeth 124 of the combed surface 122 to pass by the teeth 224 of the combed surface 222 to effectuate the transfer of the supply material 300 from the material tray 120 to the material tray 220. In some embodiments, the loading cart 100 is moved linearly (e.g., vertically) to cause the teeth 124 of the combed surface 122 to pass by the teeth 224 of the combed surface 222.

In some embodiments, the combed surface 122 and the combed surface 222 are configured to hold a freeform material. A freeform material is a material that does not hold its shape. For example, in the case where the supply material 300 is sheet paper, the bottom of the sheet paper is pliable and does not hold its shape. This makes it difficult for a person to pick up the sheet paper off of a supply cart (e.g., loading cart 100) and place it on a machine (e.g., on the material tray 220 of the machine 200). Moreover, the weight of the supply material 300 (e.g., reams of fanfold paper) makes it difficult for a person to pick up the supply material 300 off of a supply cart (e.g., loading cart 100) and place it on a machine (e.g., on the material tray 220 of the machine 200).

In some embodiments, the combed surface 122 and the combed surface 222 are configured to hold freeform supply material. In the depicted embodiments, the teeth 124 form a flat surface on which freeform supply material (e.g., a ream of fanfold paper) can be placed. Similarly, the teeth 224 form a flat surface on which freeform supply material can be placed. In this way, the combed surface 122 and the combed surface 222 are configured such that freeform supply material in the material tray 120 is transferred to the material tray 220 as the teeth 124 of the combed surface 122 pass by the teeth 224 of the combed surface 122. Transferring freeform supply material in the material tray 120 to the material tray 220 without a user attempting to lift and carry the freeform supply material prevents any issues with the freeform supply material losing its form during the transfer.

Figure 9:
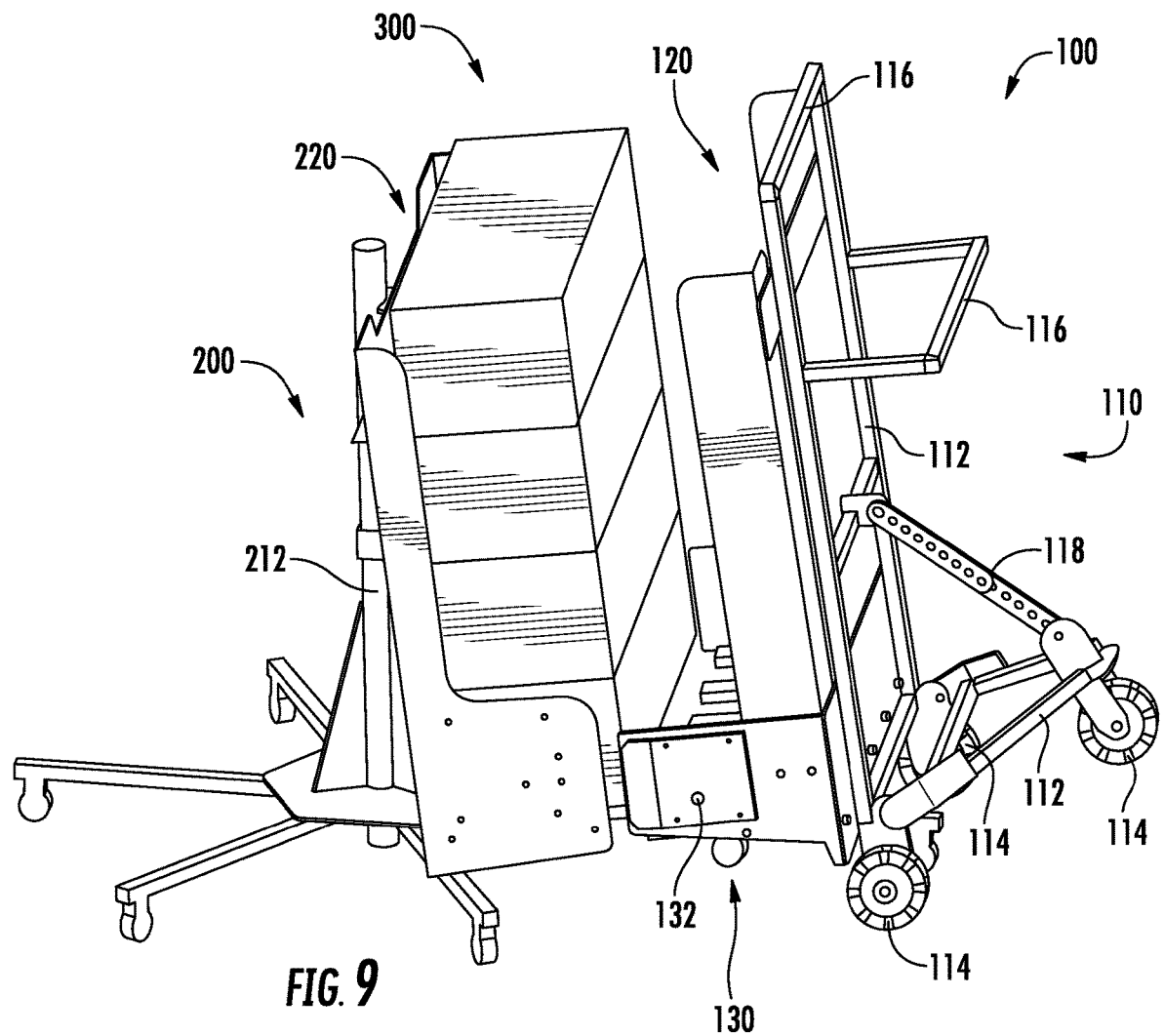

Returning to FIG. 8, the loading cart 100 can be pulled away from the machine 200 at the point depicted in FIG. 8 to the point depicted in FIG. 9. As this process is accomplished, the track engagement member 132 is guided through the track 232 from the point of the V in the track 232 to the second end 236 of the track 232 and then out of the track 232. The loading cart 100 can remain in the second rotational position as the loading cart 100 is pulled back to the point depicted in FIG. 9. In some embodiments, such as in the embodiment shown in FIGS. 8 and 9, at least one of the wheels 114 is off of the surface when the loading cart 100 is in the second rotational position. In some embodiments, when the loading cart 100 is in the second rotational position, the guide component 130 of the loading cart 100 is aligned with the guide component 230 of the machine 200. In the particular embodiment depicted in FIGS. 8 and 9, where the loading cart 100 is in the second rotational position, the height of the track engagement member 132 of the guide component 130 from the surface is aligned with the height of the second end 236 of the track 232. As shown in FIG. 9, the supply material 300 remains in the material tray 220 of the machine 200 as the loading cart 100 is pulled back away from the machine 200.

Figure 10:
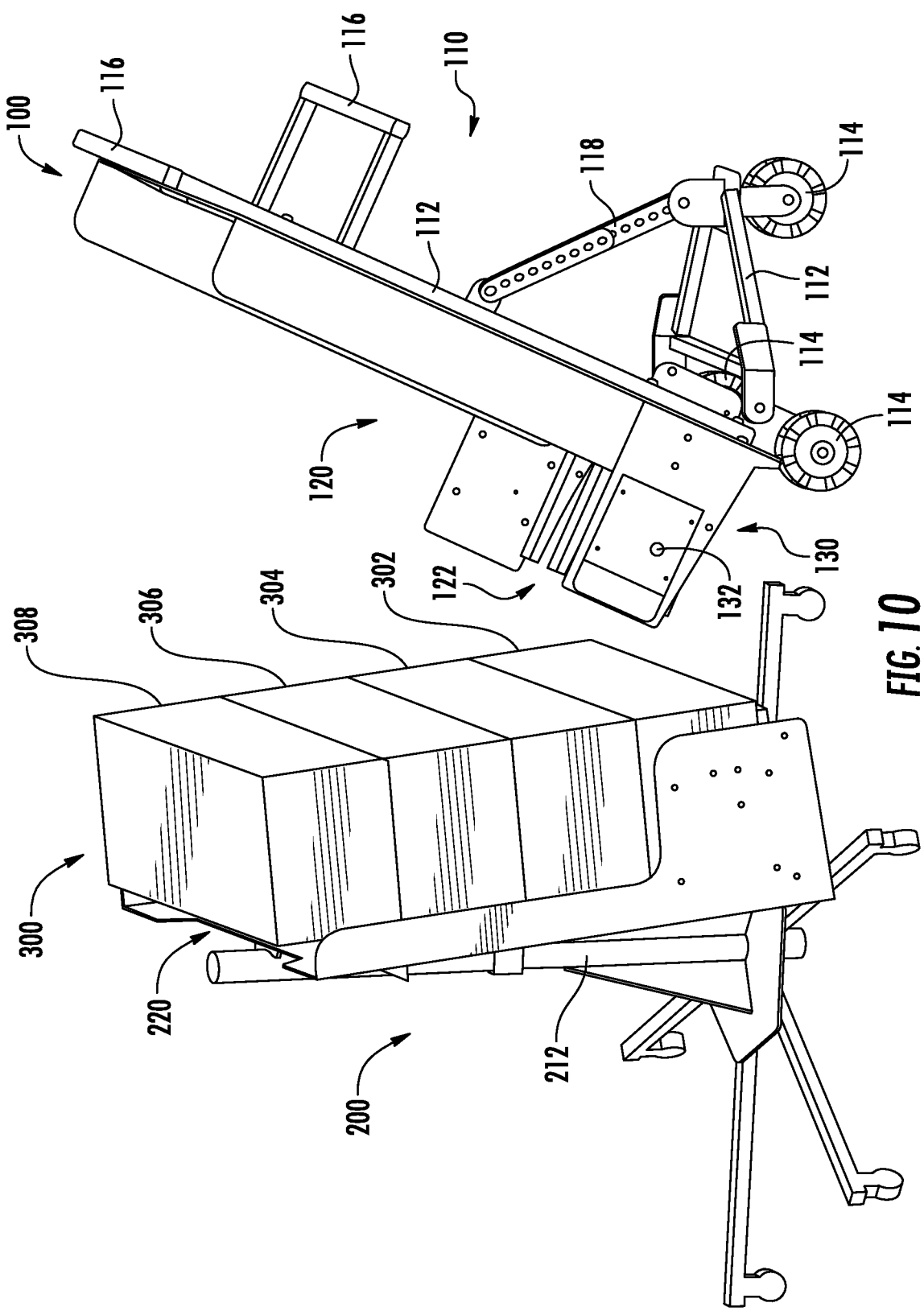

As shown in FIG. 10, the loading cart 100 can be rotated back to the first rotational position after the track engagement member 132 has exited the track 232. At that point, the loading cart 100 can be reloaded with additional supply material such that the loading cart 100 can reload the material tray 220 of the machine 200 when the machine 200 has depleted the supply material 300.

As described above, the process depicted in FIGS. 6-10 can be used to load supply material 300 onto the material tray 220 of the machine 200 from the material tray 120 of the loading cart 100. The reverse process (e.g., proceeding from FIG. 10 to FIG. 6) can also be used to unload supply material 300 from the material tray 220 of the machine 200 to the material tray 120 of the loading cart 100. Such a process may be useful in certain circumstances, such as if the machine 200 requires maintenance with the material tray 220 empty. In such a case, the loading cart 100 is pushed from the position shown in FIG. 9 while in the second rotational position such that the track engagement member 132 enters the track 232 through the second end 236 to the point depicted in FIG. 8. In some embodiments, the second end 236 of the track 232 is also a funneling end configured to direct the track engagement member 132 into the track 232. From the point depicted in FIG. 8, the loading cart 100 can be rotated from the second rotational position to cause the supply material 300 to be transferred from the material tray 220 of the machine 200 to the material tray 120 of the loading cart 100, as shown in FIG. 7. The loading cart 100 can then be pulled back until the track engagement member 132 exits the track 232 through the first end 234 and the loading cart 100 can be rotated back to the first rotational position, as shown in FIG. 6.

In the embodiment depicted in FIGS. 1, 2, and 4-10, the guide component 130 includes the track engagement member 132 and the guide component 230 includes the track 232. However, this is not the only embodiment of guide components 130 and 230. In another embodiment, the guide component 130 includes a track and the guide component 230 includes a track engagement member. In yet other embodiments, the guide components 130 and 230 have any other form that, when engaged, guide movement of the loading cart 100 with respect to the machine 200 to a point at which the loading cart 100 can be rotated to the second rotational position to cause the supply material 300 to be transferred from the material tray 120 of the loading cart 100 to the material tray 220 of the machine 200.

Figure 11:
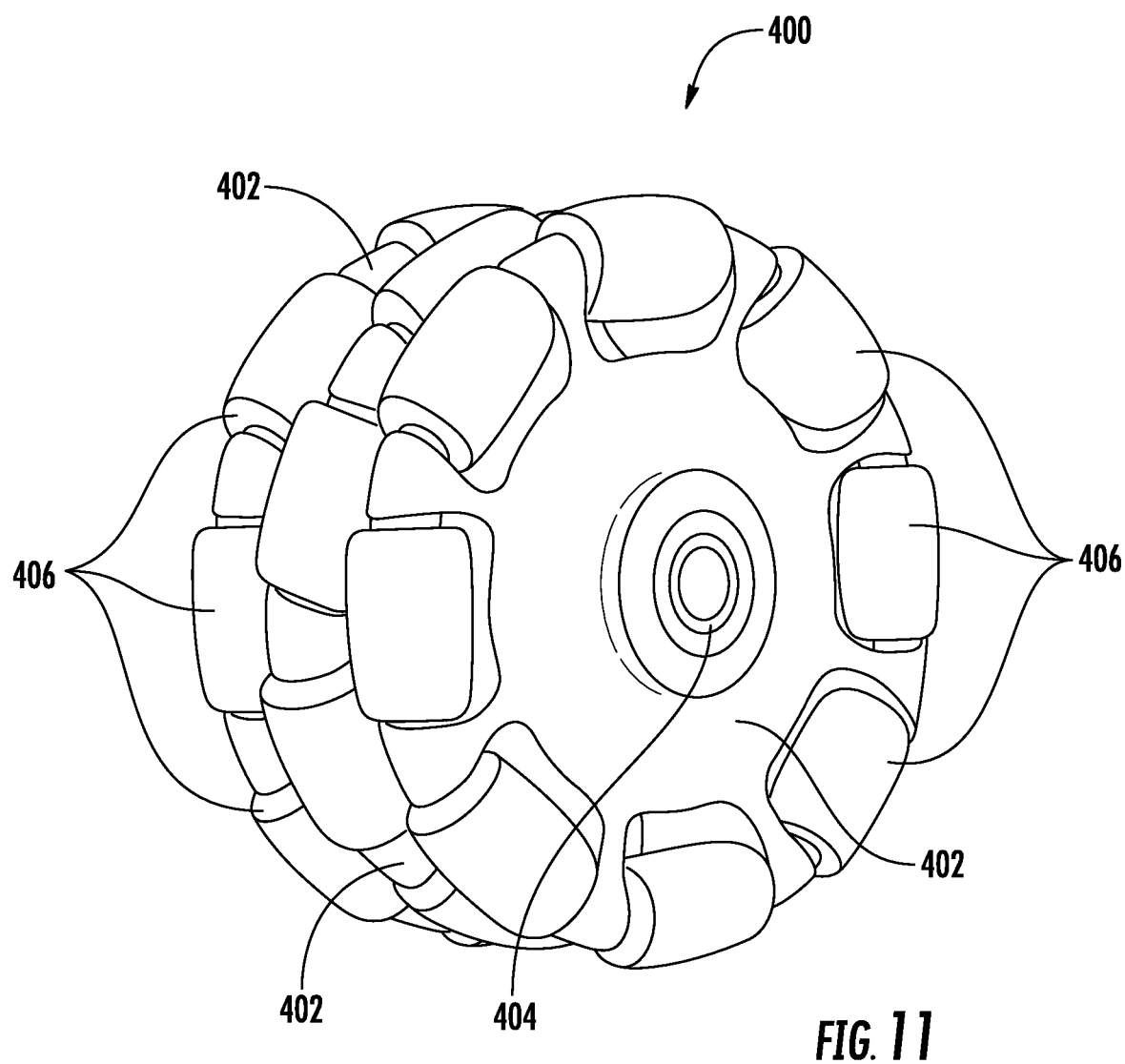
FIG. 11 depicts an embodiment of an omnidirectional wheel, in accordance with the embodiments disclosed herein.

As noted above, in some embodiments, one or more of the wheels is an omnidirectional wheel. An omnidirectional wheel is configured to allow movement in any direction along a surface. An embodiment of an omnidirectional wheel 400 is depicted in FIG. 11. The omnidirectional wheel 400 includes three discs 402 rotatably mounted to a bushing 404. While the omnidirectional wheel 400 includes three discs 402, other embodiments of omnidirectional wheels include any number of discs (i.e., one or more discs).

The discs 402 are configured to rotate about an axis of the bushing 404 to permit motion of the omnidirectional wheel 400 perpendicular to the axis of the bushing 404. The discs 402 include rollers 406 rotatably mounted around a circumference of the discs 402. The rollers 406 are configured to rotate about an axis that is parallel to a tangent of one of the discs 402 to permit motion of the omnidirectional wheel 400 parallel to the axis of the bushing 404. Thus, the discs 402 and the rollers 406 permit motion perpendicular to each other. When combining the motion of the discs 402 and the rollers 406, the omnidirectional wheel 400 is capable of moving in any direction in a plane.

Referring back to FIGS. 6 and 7, as the loading cart 100 is pushed from the position depicted in FIG. 6 to the position depicted in FIG. 7, the position and/or orientation of the loading cart 100 may need to be adjusted so that the guide component 130 on the loading cart 100 properly engages the guide component 230 on the machine 200. In some embodiments, where the wheels 114 are caster wheels or other non-omnidirectional wheels, the wheels 114 may not be aligned to move the loading cart 100 in the proper direction or to the proper orientation to allow the guide component 130 on the loading cart 100 to properly engage the guide component 230 on the machine 200. In contrast, in embodiments where wheels 114 are omnidirectional wheels, the wheels 114 permit the loading cart 100 to be moved in any direction or reoriented to face in any direction regardless of the alignment of the wheels 114. Thus, in some embodiments, the use of omnidirectional wheels on the loading cart 100 may ease burdens on users when aligning the guide component 130 on the loading cart 100 with the guide component 230 on the machine 200.

One difficulty with rotating a supply cart forward to unload supply material is that the rotation of the supply cart when it is not properly aligned with the machine may cause the supply material to fall off of the supply cart unintentionally. For example, the loading cart 100 is in the state depicted in FIG. 4 with the supply material 300 located in the material tray 120. If the loading cart 100 was rotated forward to a point at which the center of gravity of the supply material 300 was in front of the wheels 114, the supply material 300 may fall out of the material tray 120. It may be advantageous to prevent such over-rotation of a supply cart to avoid unintentional discharge of supply material.

One example of an embodiment of a loading cart 100' configured to prevent over-rotation is depicted in FIGS. 12A to 12D. The loading cart 100' is a variation of the loading cart 100 depicted in FIGS. 1 and 3-10. In the embodiment shown in FIGS. 12A and 12B, the loading cart 100' includes a pair of rotational stops 140 extending from the frame 112 forward of the wheels 114 at the front of the loading cart 100'. In some embodiments, including the embodiment depicted in FIGS. 12A and 12B, the rotational stops 140 include surface interaction mechanisms 142 coupled to the front ends of the rotational stops 140. The surface interaction mechanisms 142 are configured to contact the surface on which the loading cart 100' is located and to facilitate movement of the loading cart 100' with respect to the surface when the rotational stops 140 are in contact with the surface. In some embodiments, the surface interaction mechanisms 142 are sliders fixedly coupled to the rotational stops 140 and configured to permit the rotational stops 140 to slide along the surface. In some embodiments, the surface interaction mechanisms 142 are rollers rotatably coupled to the rotational stops 142 and configured to roll along the surface as the rotational stops 140 move with respect to the surface. In some embodiments, the position of the rollers 142 with respect to frame 112 is selected based on a particular size and/or a particular weight of a supply material to be carried in the material tray 120.

In some embodiments, the rotational stops 140 are rotatably coupled to the frame 112. In the embodiment shown in FIG. 12B, the rotational stop 140 is rotatably coupled to the frame 112 using a fastener 144. In the depicted embodiment, the wheel 114 is also rotatably coupled to the frame using the fastener 144. In some embodiments, the rotational stop 140 includes a rotation-limiting mechanism 146. The rotation-limiting mechanism 146 permits the rotational stop 140 to rotate within a particular range with respect to the frame 112. In some embodiments, a hard stop 148 is fixedly coupled to the frame 112 and is configured to prevent rotation of the rotational stop 140 with respect to the frame 112 beyond the particular range provided by the rotation-limiting mechanism 146.

Figure 12D:
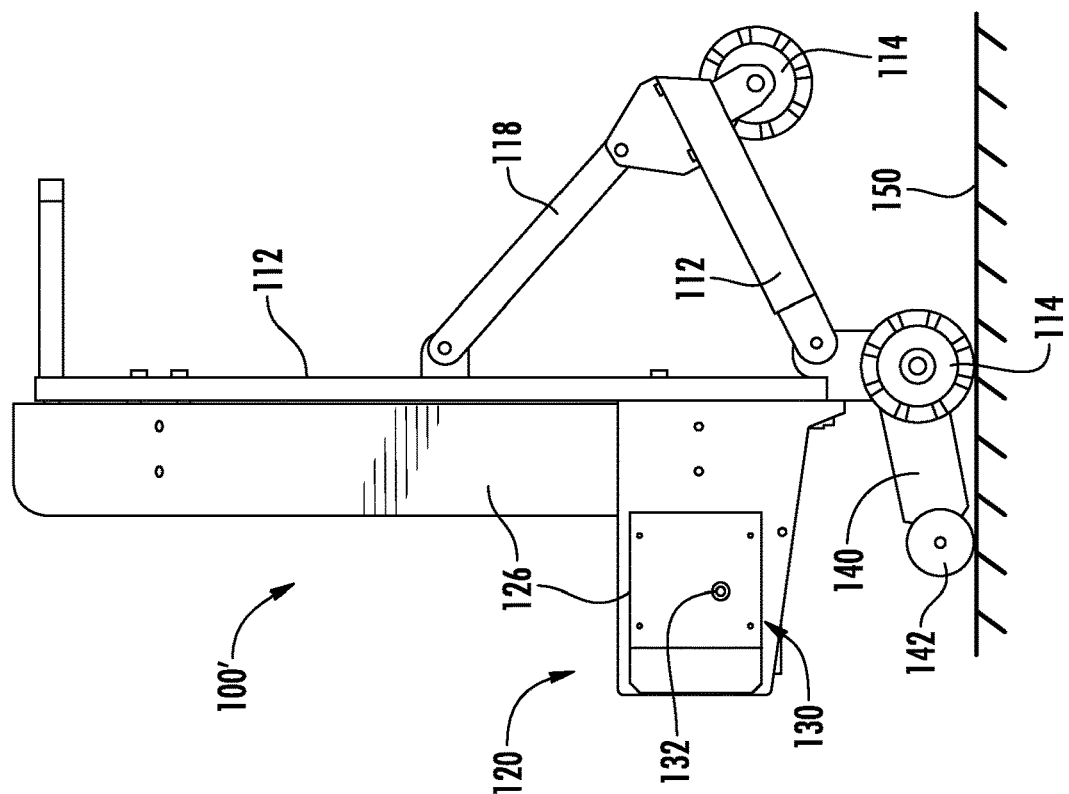
FIGS. 12C and 12D depict rotational stops configured to prevent over-rotation of the loading cart.
Figure 12C:
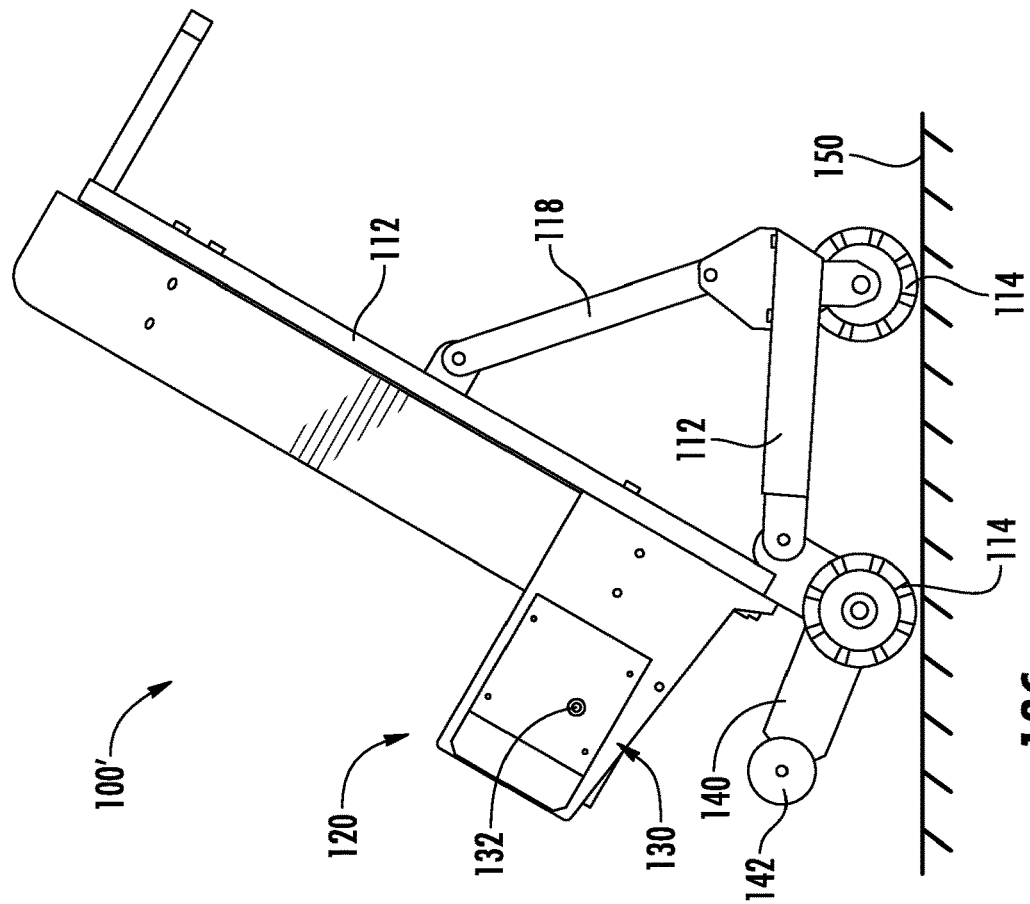

As depicted in FIGS. 12C and 12D, the rotational stops 140 are configured to prevent over-rotation of the loading cart 100'. In the instance shown in FIG. 12C, the loading cart 100' is on a surface 150 with all of the wheels 114 on the surface 150. From the instance shown in FIG. 12C, the loading cart 100' is rotated forward until it reaches the instance shown in FIG. 12D. In the instance shown in FIG. 12D, at least one of the wheels 114 is off of the surface 150, the rollers 142 of the rotations stops 140 are in contact with the surface 150, and the material tray 120 is in a substantially upright position. In this position, any supply material in the material tray 120 is unlikely to fall out of the material tray 120. While a user may continue rotating the loading cart 100' forward from the position shown in FIG. 12D, the resistance provided by the rotational stops 140 serves as a reminder to the user to stop rotating the loading cart 100' if the user does not want to lose the supply material out of the loading cart 100'.

Some embodiments of combed surfaces described herein are oriented such that, when teeth of one combed surface pass by the teeth of another combed surface, the two combed surfaces are in substantially the same orientation. For example, when the teeth 124 of the combed surface 122 of the loading cart 100 pass by the teeth 224 of the combed surface 222 of the machine 200 (e.g. at the point shown in FIG. 8), the combed surface 122 and the combed surface 222 are in substantially the same orientation with the teeth 124 substantially parallel to the teeth 224. However, in other embodiments, combed surfaces are oriented such that, when teeth of one combed surface pass by the teeth of another combed surface, the two combed surfaces are in different orientations. One example of a system with a loading cart and a machine having combed surfaces oriented such that, when teeth of one combed surface pass by the teeth of another combed surface, the two combed surfaces are in different orientations is depicted in FIGS. 13-18.

Figure 13:
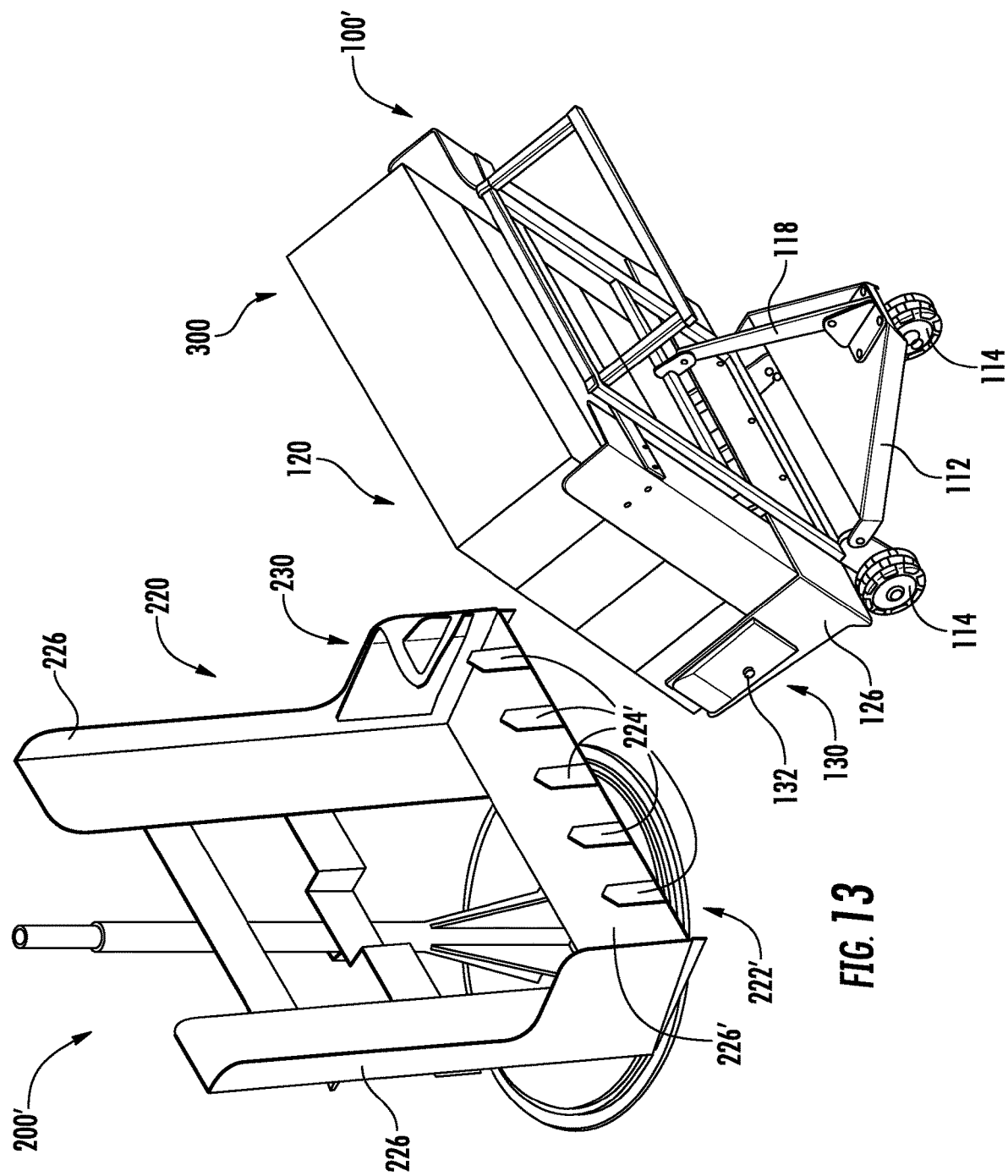
Figure 14:
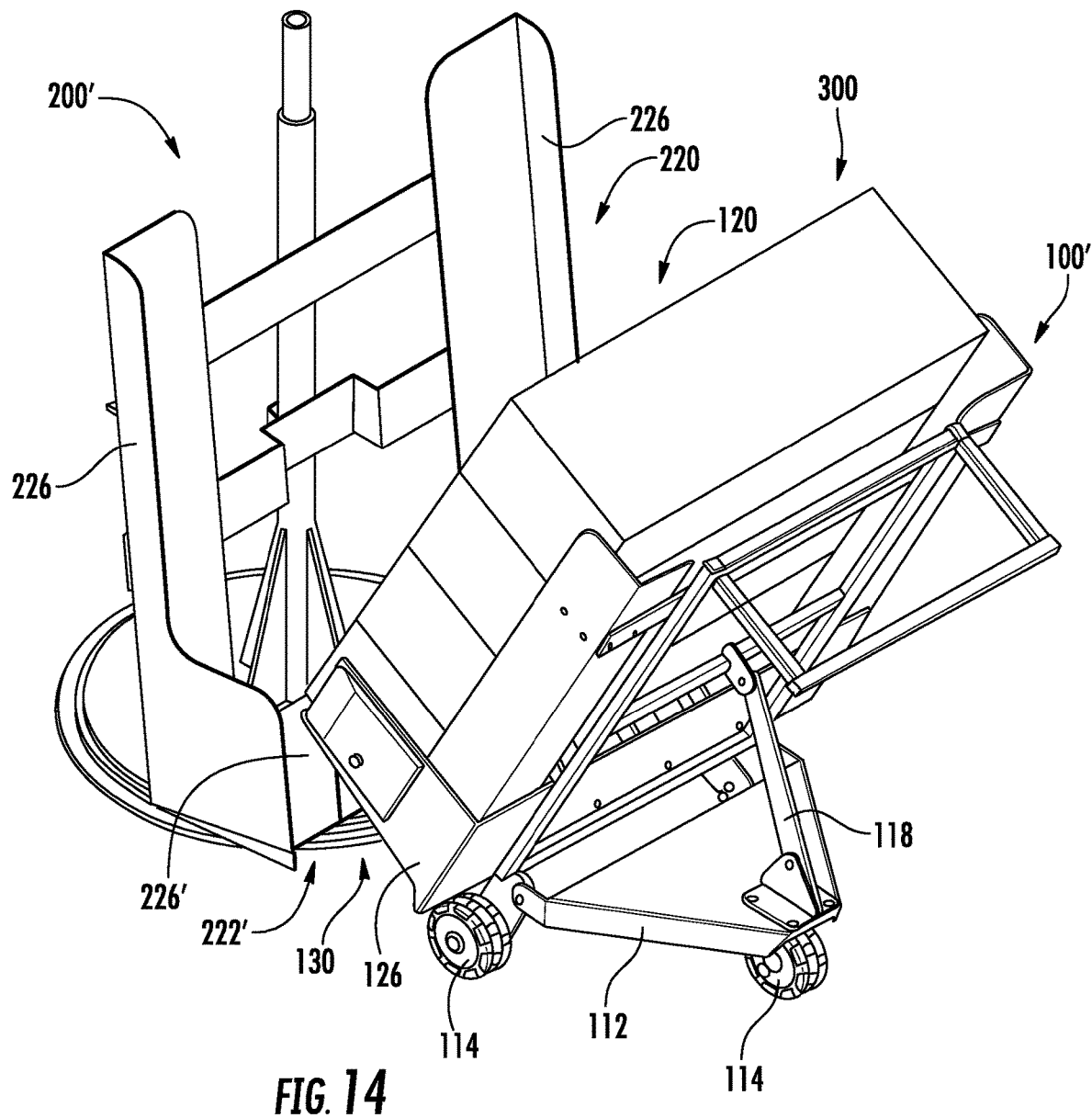

Depicted in FIG. 13 is the loading cart 100' with the supply material 300 located in the material tray 120 of the loading cart 100'. Also depicted in FIG. 13 is an embodiment of a machine 200'. The machine 200' is a variation of the machine 200 depicted in FIGS. 2-10. In the embodiment shown in FIG. 13, the material tray 220 includes side walls 226 and a bottom 226'. The material tray 220 also includes a combed surface 222' that includes individual teeth 224'. As described in greater detail below and in the sequence depicted in FIGS. 13-17, the combed surface 222' is oriented such that, when the teeth 124 of the combed surface 122 of the loading cart 100' pass by the teeth 224' of the combed surface 222' of the machine 200', the combed surface 222' is arranged in a different orientation than an orientation of the combed surface 122.

In the instance depicted in FIG. 13, the supply material 300 is fully prepared and loaded in the material tray 120 of the loading cart 100'. The loading cart 100' and the machine 200' are located on the same surface (e.g., a floor). The loading cart 100' is capable of being pushed forward from the position shown in FIG. 13 to the position shown in FIG. 14, where the guide component 130 is positioned to engage the guide component 230. As the loading cart 100' is pushed forward from its position shown in FIG. 14, the guide component 130 engages the guide component 230 to guide movement of the loading cart 100' with respect to the machine 200' to the point depicted in FIG. 15A and the detail view shown in FIG. 15B.

Figure 15B:
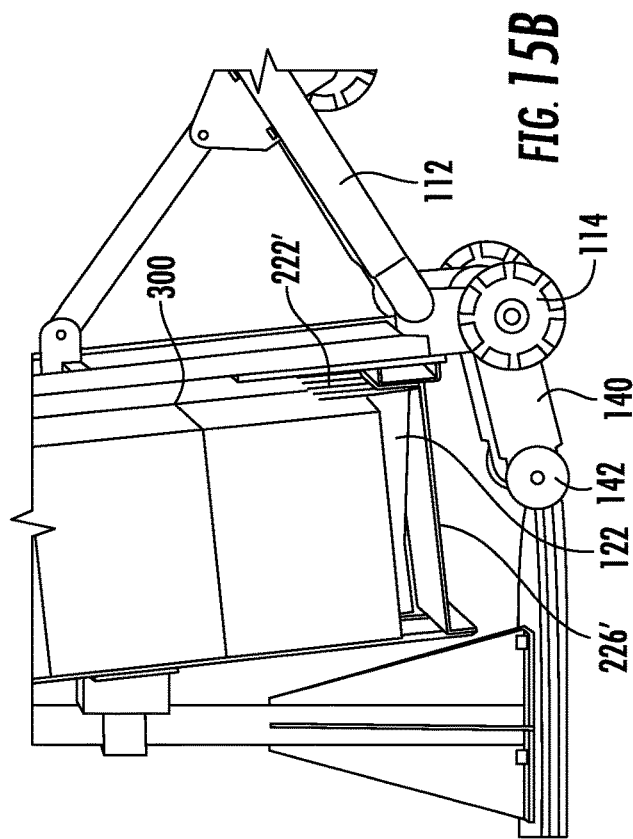
Figure 15A:
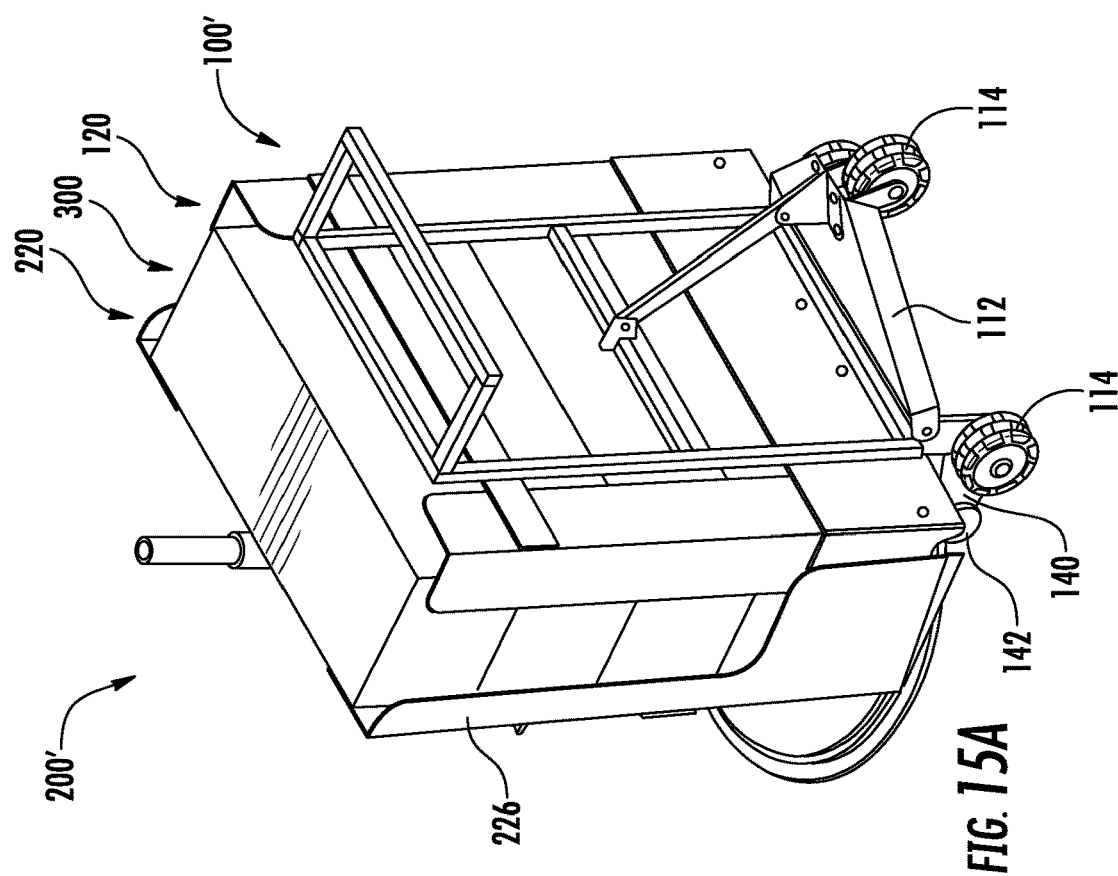

At the point depicted in FIGS. 15A and 15B, the loading cart 100' has been rotated forward such that the supply material 300 in the material tray 120 is located over the material tray 220 with a portion of the supply material located on the far side of the combed surface 222' from the loading cart 100'. In some embodiments, rotation of the loading cart 100' from a first rotational position shown in FIG. 14 to a second rotational position shown in FIGS. 15A and 15B includes translational movement of the loading cart 100'. In some embodiments, rotation of the loading cart 100' from the first rotational position shown in FIG. 14 to the second rotational position shown in FIGS. 15A and 15B does not include translational movement of the loading cart 100'. Also, at the point depicted in FIGS. 15A and 15B, the combed surface 122 and the combed surface 222 have different orientations and the teeth 124 of the combed surface 122 are located between the teeth 224' of the combed surface 222'. The orientations of the material trays 120 and 220, the combed surfaces 122 and 222', the teeth 124 and 224', and the supply material 300 at the point shown in FIG. 15A are shown in the detail view depicted in FIG. 15B. In FIG. 15B, the near side walls 126 of the loading cart 100' and the near side walls 226 of the machine 200' have been removed for better visibility. In the particular example depicted in FIGS. 15A and 15B, the combed surface 122 and the combed surface 222' are substantially perpendicular; however, in other embodiments, combed surfaces arranged in different orientations can be at any angle with respect to each other such that the two combed surfaces are not in substantially the same orientation.

In some embodiments, such as in the embodiment shown in FIGS. 15A and 15B, the rotational stops 140 contact the surface as when the loading cart 100' is rotated forward to position the supply material 300 over the material tray 220. In the particular example shown in FIGS. 15A and 15B, the loading cart 100' is rotated forward to a point at which the rotational stops 140 are on the surface and the wheels 114 are off of the surface. In such an example, having the rollers 142 on the forward ends of the rotational stops 140 aids in the movement of the loading cart 100' from the point depicted in FIGS. 15A and 15B.

Figure 17:
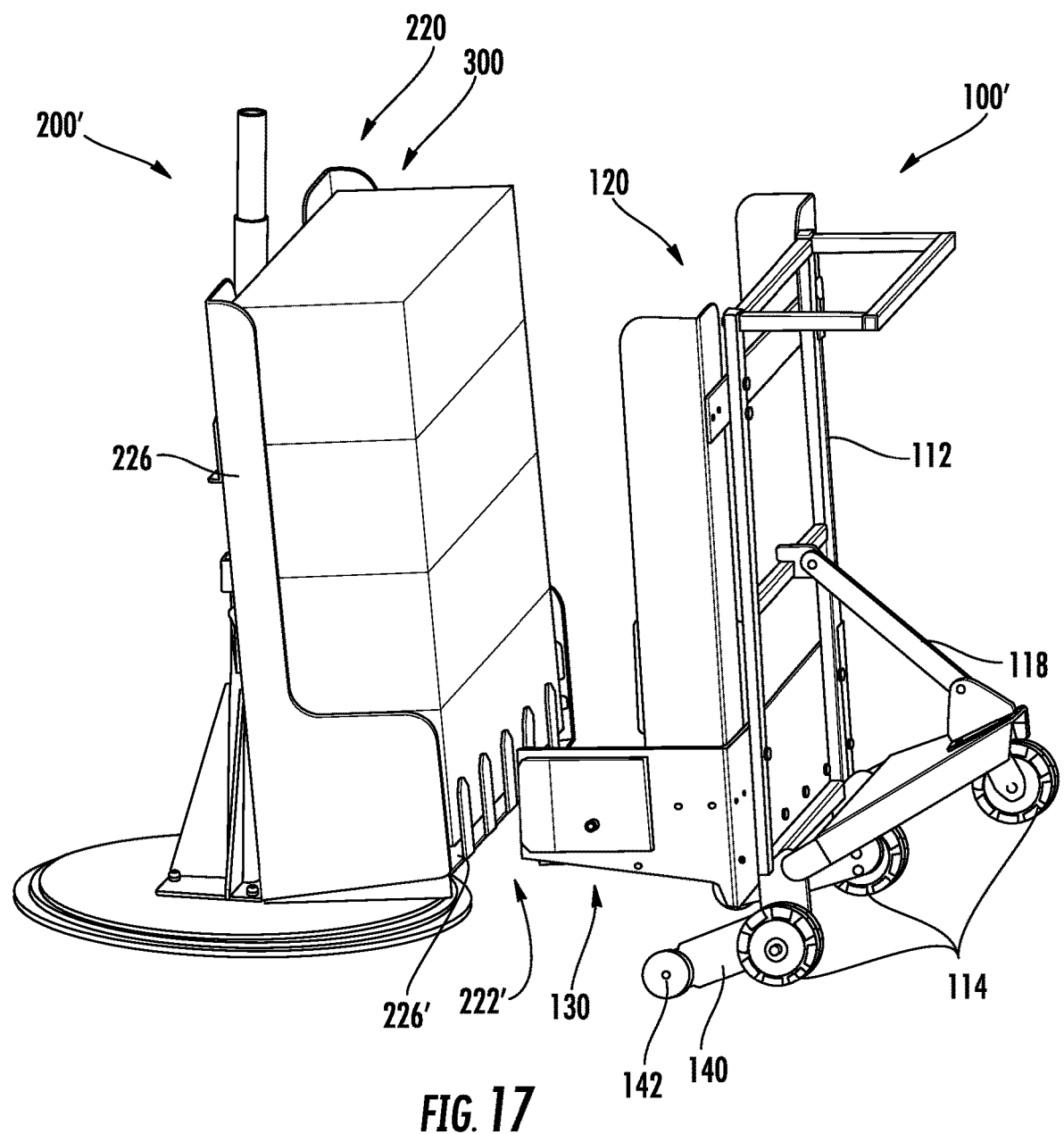

From the position shown in FIGS. 15A and 15B, the loading cart 100' can be pulled away from the machine 200' to the point depicted in FIGS. 16A and 16B. As the loading cart 100' is pulled away from the machine 200', the lower portion of the supply material 300 contacts the teeth 224' of the combed surface 222' and the combed surface 222' prevents the supply material from moving away from the machine 200' with the movement of the loading cart 100'. The loading cart 100' can be pulled further back from the machine 200' until the teeth 124 have been pulled by teeth 224', as shown in FIG. 17, where the loading cart 100' is fully withdrawn from the machine 200'. The supply material 300 is transferred from the material tray 120 of the loading cart 100' to the material tray 220 of the machine 200' because the supply material drops off the teeth 124 of the combed surface 122 onto the bottom 226' of the material tray 220 as the teeth 124 of the combed surface 122 pass by the teeth 224' of the combed surface 222'. In some embodiments, the teeth 124 of the combed surface 122 are configured such that, when the supply material 300 is a freeform material, the freeform material is capable of dropping from the combed surface 122 to the bottom 226' of the material tray 220 into a position where the freeform material is usable by the machine 200'.

Figure 18:
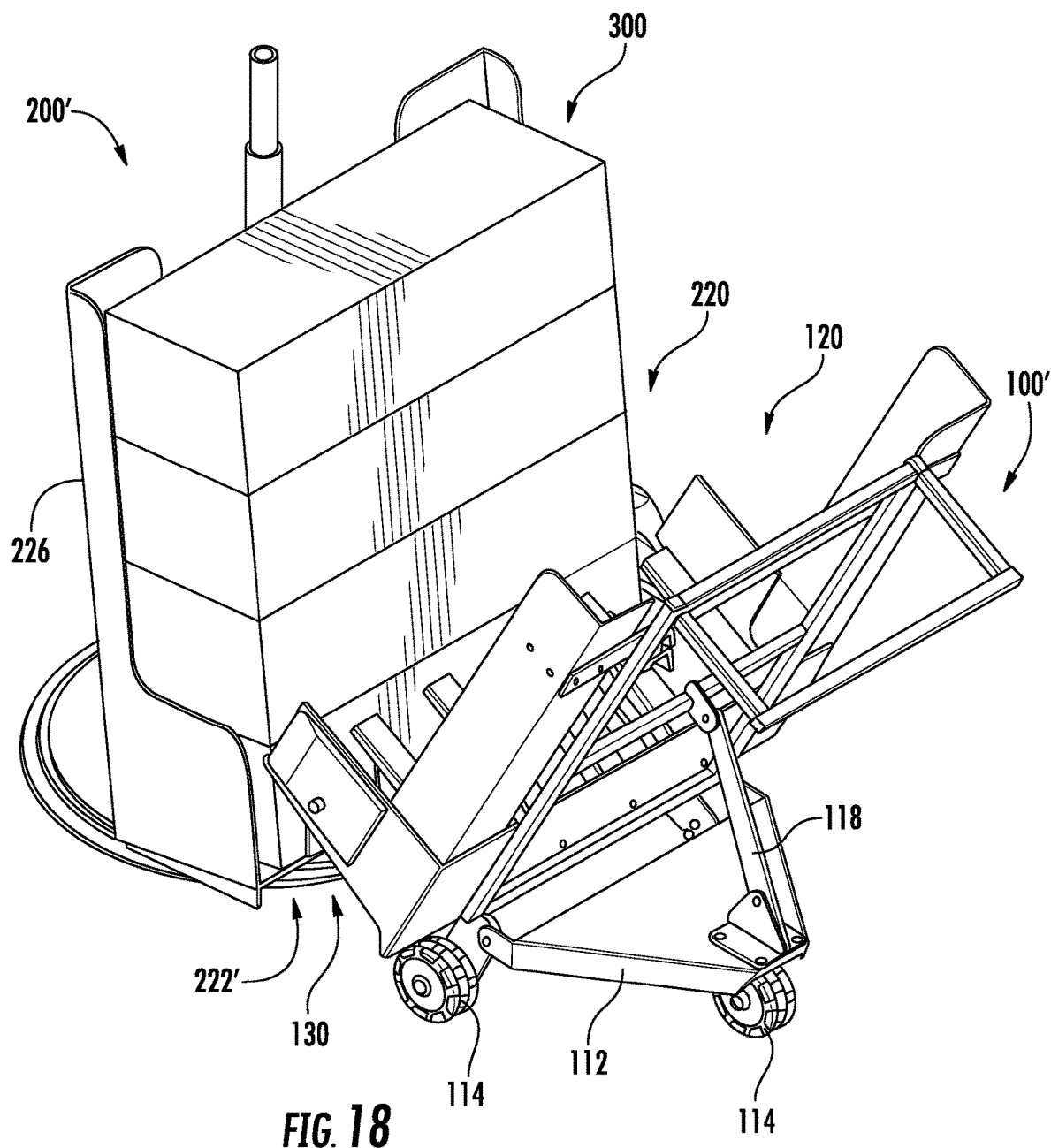

In some embodiments, such as in the embodiment shown in FIGS. 15A, 15B, 16A, 16B, and 17, all of the wheels 114 are off of the surface and the rollers 142 are on the surface when the loading cart 100' is pulled back from the machine 200'. As shown in FIG. 18, after the loading cart 100' is fully withdrawn from the machine 200' and the guide component 130 is no longer engaged with the guide component 230, the loading cart 100' can be rotated back to its original rotational position. At that point, the loading cart 100' can be reloaded with additional supply material such that the loading cart 100' can reload the material tray 220 of the machine 200' when the machine 200' has depleted the supply material 300.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A reloading supply system, comprising:
a loading cart having a first material tray, wherein the first material tray includes a first combed surface configured to retain a supply material in the first material tray; and
a machine comprising a second material tray, wherein the second material tray includes a second combed surface configured to retain the supply material in the second material tray after the supply material is transferred from the first material tray of the loading cart to the second material tray of the machine;
wherein teeth of the first combed surface are configured to pass by teeth of the second combed surface;
wherein the first combed surface and the second combed surface are configured such that the supply material in the first tray is transferred to the second tray as the teeth of the first combed surface pass by the teeth of the second combed surface;
wherein the loading cart is configured to be rotated to cause the teeth of the first combed surface to pass by the teeth of the second combed surface to transfer the supply material from the first material tray to the second material tray;
wherein the loading cart comprises a first guide component and the machine comprises a second guide component;
wherein one of the first and second guide components comprises a track having a first end and a second end;
wherein the other of the first and second guide components comprises a track engagement member configured to be moved through the track between the first end and the second end;
wherein the track engagement member is configured to enter the first ends of the track when the loading cart is in a first rotational position;
wherein the track is configured to guide the guide movement of the track engagement member to a point between the first and second ends of the track at which rotation of the loading cart to a second rotational position causes the teeth of the first combed surface to pass by the teeth of the second combed surface to transfer the supply material from the first material tray to the second material tray; and
wherein the track engagement member is configured to exit the second end of the track when the loading cart is in the second rotational position.

2. The reloading supply system of claim 1, wherein the supply material includes a plurality of stacked reams of fanfold paper.

3. The reloading supply system of claim 2, wherein an end sheet of a first ream of the plurality of stacked reams is coupled to an end sheet of a second ream of the plurality of stacked reams such that the first ream and the second ream form a continuous segment of the fanfold paper.

4. The reloading supply system of claim 1, wherein the track engagement member is configured to be aligned with the first end of the track when the loading cart is in the first rotational position, and wherein the track engagement member is configured to be aligned with the second end of the track when the loading cart is in the second rotational position.

5. The reloading supply system of claim 1, wherein the first end of the track is a funneling end configured to direct the track engagement member into the track.

6. The reloading supply system of claim 1, wherein the second end of the track is a funneling end configured to direct the track engagement member into the track.

7. The reloading supply system of claim 1, wherein the loading cart comprises a plurality of wheels configured to be on a surface when the loading cart is in the first rotational position.

8. The reloading supply system of claim 7, wherein at least one of the plurality of wheels is configured to be off of the surface when the loading cart is in the second rotational position.

9. The reloading supply system of claim 1, wherein the loading cart comprises at least one omnidirectional wheel.

10. The reloading supply system of claim 1, wherein the loading cart is uncoupled from the machine after the track engagement member exits the second end of the track.

11. The reloading supply system of claim 10, wherein the loading cart is also uncoupled from the machine after the track engagement member exits the second end of the track.

12. The reloading supply system of claim 1, wherein the track is in the form of a V at the point between the first and second ends of the track at which the loading cart is configured to rotate to the second rotational position.

* * * * *